United States Patent
Jinno et al.

(10) Patent No.: US 8,037,267 B2
(45) Date of Patent: Oct. 11, 2011

(54) REMOTE COPY SYSTEM AND REMOTE SITE POWER SAVING METHOD

(75) Inventors: Taichi Jinno, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 588 days.

(21) Appl. No.: 12/233,789

(22) Filed: Sep. 19, 2008

(65) Prior Publication Data

US 2010/0023717 A1    Jan. 28, 2010

(30) Foreign Application Priority Data

Jul. 23, 2008  (JP) ................. 2008-190179

(51) Int. Cl.
   *G06F 12/16* (2006.01)
(52) U.S. Cl. ......... 711/162; 711/165; 707/649; 707/654
(58) Field of Classification Search ........................ None
   See application file for complete search history.

(56) References Cited

U.S. PATENT DOCUMENTS

| | | | |
|---|---|---|---|
| 6,880,051 B2* | 4/2005 | Timpanaro-Perrotta | 711/162 |
| 2007/0168404 A1 | 7/2007 | Nakamura et al. | |
| 2010/0125712 A1* | 5/2010 | Murase et al. | 711/162 |
| 2010/0131697 A1* | 5/2010 | Alrod et al. | 711/103 |
| 2010/0138621 A1* | 6/2010 | Arifin | 711/162 |

FOREIGN PATENT DOCUMENTS

JP    2007-193451    8/2007

* cited by examiner

*Primary Examiner* — John Lane
(74) *Attorney, Agent, or Firm* — Brundidge & Stanger, P.C.

(57) ABSTRACT

A computer migrates to the same remote controller, from among a plurality of remote virtual computers at a remote site, two or more remote virtual computers belonging to a group configured from remote virtual computers with similar remote copy patterns. In the remote controller, these two or more remote virtual computers and remote virtual computers with dissimilar remote copy patterns do not reside.

18 Claims, 26 Drawing Sheets

FIG. 3A

PVOL-Li

| | |
|---|---|
| BLOCK ADDRESS 0 | A |
| BLOCK ADDRESS 1 | B |
| BLOCK ADDRESS 2 | C |
| BLOCK ADDRESS 3 | D |
| BLOCK ADDRESS 4 | E |
| BLOCK ADDRESS 5 | F |
| BLOCK ADDRESS 6 | G |
| BLOCK ADDRESS 7 | H |

DVOL-Li

BLOCK ADDRESS 0, BLOCK ADDRESS 1, BLOCK ADDRESS 2, BLOCK ADDRESS 3, BLOCK ADDRESS 4, BLOCK ADDRESS 5, ...

SNAPSHOT MANAGEMENT TABLE-Li

| BLOCK ADDRESS | COW | SNAPSHOT NAME | | |
|---|---|---|---|---|
| 0 | 0000 | NONE | NONE | NONE |
| 1 | 0000 | NONE | NONE | NONE |
| 2 | 0000 | NONE | NONE | NONE |
| 3 | 0000 | NONE | NONE | NONE |
| 4 | 0000 | NONE | NONE | NONE |
| 5 | 0000 | NONE | NONE | NONE |
| 6 | 0000 | NONE | NONE | NONE |
| 7 | 0000 | NONE | NONE | NONE |

FIG. 3B

PVOL-Li

| | |
|---|---|
| BLOCK ADDRESS 0 | A |
| BLOCK ADDRESS 1 | B |
| BLOCK ADDRESS 2 | C |
| BLOCK ADDRESS 3 | D |
| BLOCK ADDRESS 4 | E |
| BLOCK ADDRESS 5 | F |
| BLOCK ADDRESS 6 | G |
| BLOCK ADDRESS 7 | H |

DVOL-Li

BLOCK ADDRESS 0, BLOCK ADDRESS 1, BLOCK ADDRESS 2, BLOCK ADDRESS 3, BLOCK ADDRESS 4, BLOCK ADDRESS 5, ...

SNAPSHOT MANAGEMENT TABLE-Li

| BLOCK ADDRESS | COW | SNAPSHOT NAME | | |
|---|---|---|---|---|
| 0 | 1000 | SS-1 | NONE | NONE |
| 1 | 1000 | NONE | NONE | NONE |
| 2 | 1000 | NONE | NONE | NONE |
| 3 | 1000 | NONE | NONE | NONE |
| 4 | 1000 | NONE | NONE | NONE |
| 5 | 1000 | NONE | NONE | NONE |
| 6 | 1000 | NONE | NONE | NONE |
| 7 | 1000 | NONE | NONE | NONE |

FIG. 7A

| PVOL-Li (-Ri) | | DVOL-Li (-Ri) | | Snapshot Management Table-Li (-Ri) | | | |
|---|---|---|---|---|---|---|---|
| | | | | BLOCK ADDRESS | COW | SS-1 | SNAPSHOT NAME |
| BLOCK ADDRESS 0 | A | BLOCK ADDRESS 0 | | 0 | 1000 | NONE | NONE NONE NONE |
| BLOCK ADDRESS 1 | B | BLOCK ADDRESS 1 | | 1 | 1000 | NONE | NONE NONE NONE |
| BLOCK ADDRESS 2 | C | BLOCK ADDRESS 2 | | 2 | 1000 | NONE | NONE NONE NONE |
| BLOCK ADDRESS 3 | D | BLOCK ADDRESS 3 | | 3 | 1000 | NONE | NONE NONE NONE |
| BLOCK ADDRESS 4 | E | BLOCK ADDRESS 4 | | 4 | 1000 | NONE | NONE NONE NONE |
| BLOCK ADDRESS 5 | F | BLOCK ADDRESS 5 | | 5 | 1000 | NONE | NONE NONE NONE |
| BLOCK ADDRESS 6 | G | | | 6 | 1000 | NONE | NONE NONE NONE |
| BLOCK ADDRESS 7 | H | | | 7 | 1000 | NONE | NONE NONE NONE |

NUMBER OF COW THAT OCCURRED BETWEEN SNAPSHOTS

FIG. 7B

| PVOL-Li | | DVOL-Li | | Snapshot Management Table-Li | | | | |
|---|---|---|---|---|---|---|---|---|
| | | | | BLOCK ADDRESS | COW | SS-1 | SS-2 | SNAPSHOT NAME |
| BLOCK ADDRESS 0 | x | BLOCK ADDRESS 0 | A | 0 | 0100 | 0 | NONE | NONE NONE NONE |
| BLOCK ADDRESS 1 | y | BLOCK ADDRESS 1 | B | 1 | 0100 | 1 | NONE | NONE NONE NONE |
| BLOCK ADDRESS 2 | c | BLOCK ADDRESS 2 | C | 2 | 0100 | 2 | NONE | NONE NONE NONE |
| BLOCK ADDRESS 3 | d | BLOCK ADDRESS 3 | D | 3 | 0100 | 3 | NONE | NONE NONE NONE |
| BLOCK ADDRESS 4 | e | BLOCK ADDRESS 4 | E | 4 | 0100 | 4 | NONE | NONE NONE NONE |
| BLOCK ADDRESS 5 | F | BLOCK ADDRESS 5 | | 5 | 1100 | NONE | NONE | NONE NONE NONE |
| BLOCK ADDRESS 6 | G | | | 6 | 1100 | NONE | NONE | NONE NONE NONE |
| BLOCK ADDRESS 7 | H | | | 7 | 1100 | NONE | NONE | NONE NONE NONE |
| | | | | | | 5 | | |

NUMBER OF COW THAT OCCURRED BETWEEN SNAPSHOTS

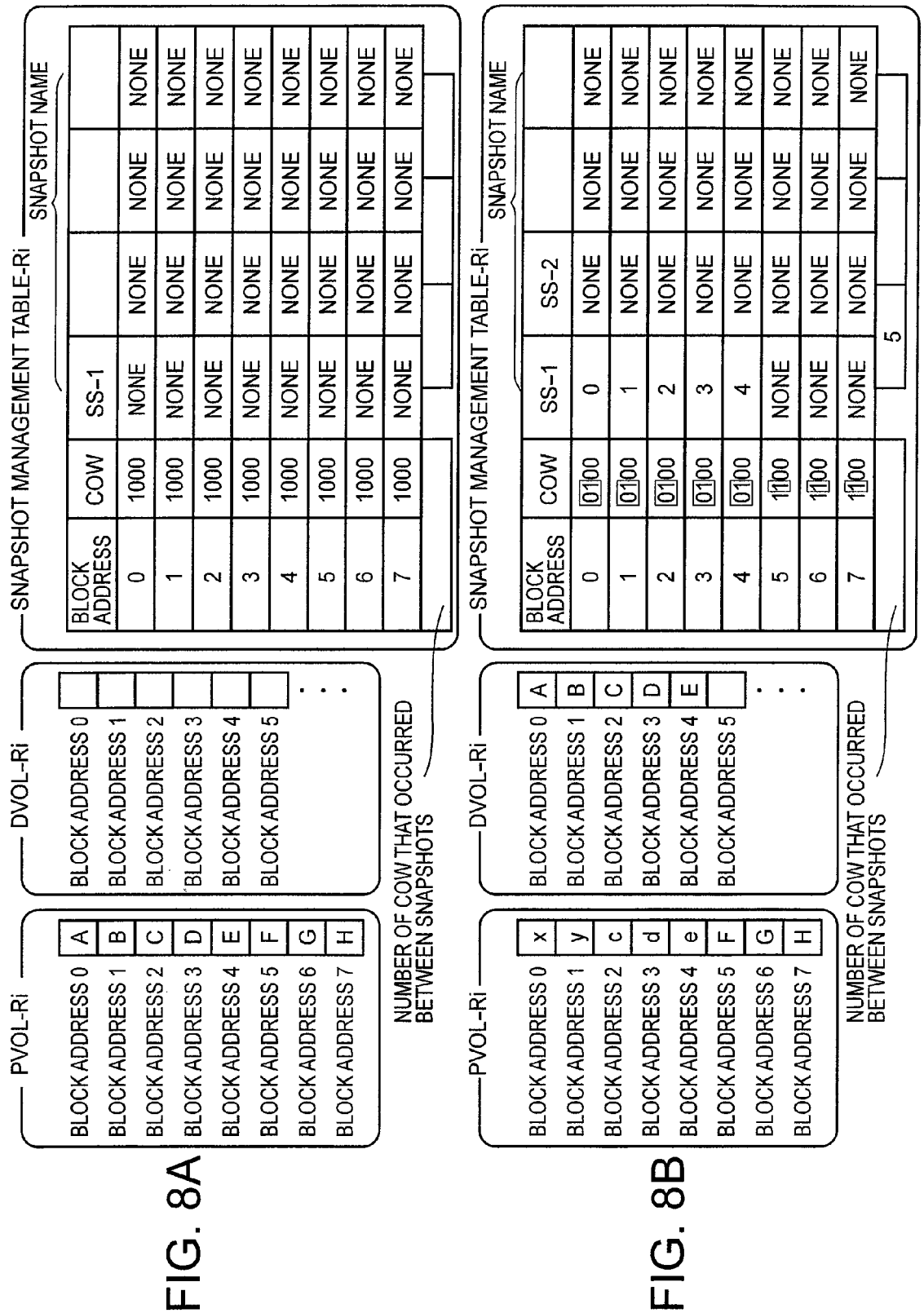

FIG. 12A

LOG INFORMATION (VIRTUAL NAS-L1)
2008/4/15 01:00   COPY START
2008/4/15 01:10   COPY END

2008/4/15 06:00   COPY START
2008/4/15 06:10   COPY END

DIFFERENCE DATA AMOUNT
(VIRTUAL NAS-L1) :
100MB

FIG. 12B

LOG INFORMATION (VIRTUAL NAS-L2)
2008/4/15 03:00   COPY START
2008/4/15 03:20   COPY END

2008/4/15 08:00   COPY START
2008/4/15 08:20   COPY END

DIFFERENCE DATA AMOUNT
(VIRTUAL NAS-L2) :
200MB

FIG. 12C

LOG INFORMATION (VIRTUAL NAS-L3)
2008/4/15 01:00   COPY START
2008/4/15 01:10   COPY END

2008/4/15 06:00   COPY START
2008/4/15 06:10   COPY END

DIFFERENCE DATA AMOUNT
(VIRTUAL NAS-L3) :
100MB

FIG. 12D

LOG INFORMATION (VIRTUAL NAS-L4)
2008/4/15 03:00   COPY START
2008/4/15 03:20   COPY END

2008/4/15 08:00   COPY START
2008/4/15 08:20   COPY END

DIFFERENCE DATA AMOUNT
(VIRTUAL NAS-L4) :
200MB

| NAS SERVER NAME | MAXIMUM CAPACITY (VIRTUAL NAS) | CAPACITY |
|---|---|---|
| NAS SERVER-R1 | 10 | 5 |
| NAS SERVER-R2 | 15 | 7 |
| NAS SERVER-R3 | 20 | 12 |
| : | : | : |

1300

| NAS SERVER NAME | VIRTUAL NAS NAME | D-VOL NAME | DIFFERENCE DATA AMOUNT (D-VOL UNITS) | DIFFERENCE DATA AMOUNT (VIRTUAL NAS UNIT) | DIFFERENCE DATA AMOUNT (NAS SERVER UNIT) |
|---|---|---|---|---|---|
| NAS SERVER-L1 | VIRTUAL NAS-L1 | D-VOL1 | 20MB | 50MB | 90MB |
| | | D-VOL2 | 30MB | | |
| | VIRTUAL NAS-L2 | D-VOL3 | 40MB | 40MB | |
| NAS SERVER-L2 | : | : | : | | |

1800

REMOTE COPY SYSTEM AND REMOTE SITE POWER SAVING METHOD

CROSS-REFERENCE TO PRIOR APPLICATION

This application relates to and claims the benefit of priority from Japanese Patent Application number 2008-190179, filed on Jul. 23, 2008 the entire disclosure of which is incorporated herein by reference.

BACKGROUND

The present invention generally relates to remote copying and power saving.

A remote copy system, which is configured from a plurality of storage controllers and a plurality of storage devices at a local site, and a plurality of storage controllers and a plurality of storage devices at a remote site, is known (Hereinafter, the storage controllers and storage devices at the local site will be referred to as the "local controller" and the "local storage device", and the storage controllers and storage devices at the remote site will be referred to as the "remote controller" and the "remote storage device".).

In the remote copy system, the local controller reads out data from the local storage device and transfers this data to the remote controller, and the remote controller receives the data from the local controller, and writes the received data to the remote storage device. In other words, data stored in the local storage device is remote copied to the remote storage device.

Data to be remote copied, for example, includes data that configures a snapshot. The local controller, for example, acquires a still image of a file system at a certain point in time as a snapshot. The local controller can manage a plurality of generations of snapshots (that is, still images of a plurality of points in time).

Japanese Patent Application Laid-open Number 2007-193451 (hereinafter referred to as Patent Document 1) discloses technology that remote copies data that configures a snapshot.

It is preferable to reduce the power consumption of the remote copy system. As one method for achieving this, a method that puts the local controller and/or the remote controller in a power-saving mode when not carrying out processing related to a remote copy can be considered. However, since there is normally no way of telling when the local controller will receive an access command (a write command or read command) from a higher-level device, it is probably not preferable to put the local controller in the power-saving mode even if the local controller is not engaged in remote copy-related processing. Accordingly, putting the remote controller in the power-saving mode (for example, a state in which the power is turned OFF) while not carrying out remote copy-related processing (receiving data, or writing received data) is considered.

Meanwhile, for example, a remote copy system in which a plurality of virtual computers operate in the local controller and the remote controller can be considered. In this case, the exchange of remote copy-targeted data is carried out between virtual computers (hereinafter, a virtual computer running on the local controller will be referred to as the "local virtual computer" and a virtual computer running on the remote controller will be referred to as the "remote virtual computer".).

When a plurality of remote virtual computers exists in a certain remote controller or a remote controller group, for example, even if a certain remote virtual computer is in a non-operating mode (is not engaged in processing related to a remote copy), if another remote virtual computer is in an operating mode (is engaged in processing related to a remote copy), it is not possible to put this certain remote controller in the power-saving mode. Further, for example, for a remote controller in the power-saving mode, if a certain remote virtual computer does not have to be in the operation mode but another remote virtual computer does have to be in the operating mode, this remote controller will have to be released from the power-saving mode.

SUMMARY

Accordingly, an object of the present invention is to reduce the power consumption of a remote controller group in a remote copy system in which a remote copy is carried out between a local virtual computer and a remote virtual computer.

A computer migrates to the same remote controller two or more remote virtual computers that belong to a group configured from remote virtual computers having mutually similar remote copy patterns from among a plurality of remote virtual computers at the remote site. A remote virtual computer having a dissimilar remote copy pattern does not redside with these two or more remote virtual computers in this remote controller.

The local controller and/or remote controller, for example, are file servers, more specifically, NAS devices. Further, the local controller and/or the remote controller, for example, are realized using circuit boards, and can be embedded in the storage system as one of the interfaces with a client.

BRIEF DESCRIPTION OF THE DRAWINGS

FIG. 3A shows a PVOL-Li, DVOL-Li and snapshot management table-Li of a certain point in time;

FIG. 3B shows a PVOL-Li, DVOL-Li and snapshot management table-Li at the point in time at which a snapshot (SS-1) is acquired;

FIG. 7A shows a PVOL-Li (-Ri), DVOL-Li (-Ri) and snapshot management table-Li (-Ri) when an initial copy ends;

FIG. 7B shows a PVOL-Li, DVOL-Li and snapshot management table-Li when a COW (Copy On Write) occurs five times for a snapshot (SS-1) on the local side;

FIG. 8A shows a snapshot management table-Ri to be sent to a remote copy program-Li, and the PVOL-Ri and DVOL-Ri at that time;

FIG. 8B shows a PVOL-Ri, DVOL-Ri and snapshot management table-Ri subsequent to the remote copying of snapshot difference data;

FIG. 12A shows log information and difference data quantity information outputted by virtual NAS-L1;

FIG. 12B shows log information and difference data quantity information outputted by virtual NAS-L2;

FIG. 12C shows log information and difference data quantity information outputted by virtual NAS-L3;

FIG. 12D shows log information and difference data quantity information outputted by virtual NAS-L4;

DESCRIPTION OF THE PREFERRED EMBODIMENTS

One embodiment of the present invention will be explained hereinbelow by referring to the figures. In so doing, the respective storage areas, which are the component elements of a logical volume, will be referred to as "blocks", and the data stored in a single block will be referred to as "block data". Further, a NAS (Network Attached Storage) server will be given as an example of a local controller and a remote controller. A virtual NAS will be given as an example of a local virtual computer and a remote virtual computer. A management server will be given as an example of a management computer. A client device will be given as an example of a higher-level device.

Figure 1:
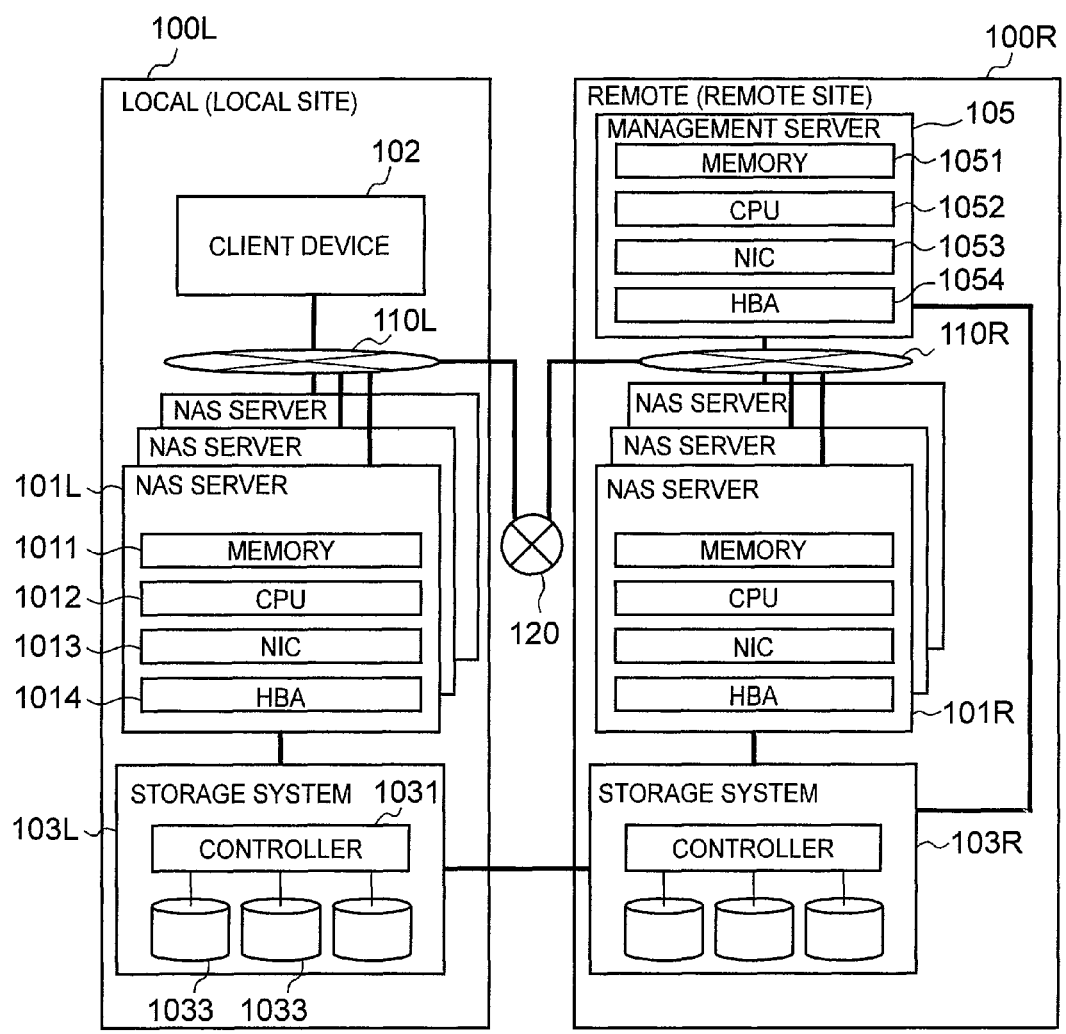
FIG. 1 shows the hardware configuration of a computer system related to one embodiment of the present invention.

FIG. 1 shows the hardware configuration of a computer system related to one embodiment of the present invention.

There is a local site 100L and a remote site 100R.

The local site 100L has one or more client devices 102; a plurality of NAS servers 101L; and a storage system 103L. The one or more client devices 102 and the plurality of NAS servers 101L are connected via a first communication network (for example, a LAN (Local Area Network)) 110L. The first communication network 110L is connected to a third communication network (for example, the Internet) 120. The plurality of NAS servers 101L is connected to the storage system 103L.

The client device 102 sends a file level access command that specifies an access-targeted file (either a read-targeted or write-targeted file) to the NAS server 101L.

As a computer resource, for example, the NAS server 101L has a memory 1011; CPU (Central Processing Unit) 1012; NIC (Network Interface Card) 1013; and HBA (Host Bus Adapter) 1014. A virtual NAS, which will be explained hereinbelow, is operated on the basis of this computer resource. The NIC 1013 is connected to the first communication network 110L. The HBA 1014 is connected to the controller 1031 of the storage system 103L. In the NAS server 101L, for example, an OS (Operating System) or other such computer program for controlling the NAS server 101L is read into the memory 1011, and this read-in computer program is executed by the CPU 1012. Further, the NAS server 101L carries out communications with NAS server 101R and a management server 105 via the NIC 1013. Further, the NAS server 101L receives a file level access command from the client device 102, and, on the basis of this access command, sends a file level access request to the storage system 103L by way of the HBA 1014.

The storage system 103L comprises a controller 1031, and a plurality of physical storage devices 1033. Although not shown in the figure, the controller 1031 has a CPU and a memory. The controller 1031 receives an access request from the NAS server 101L, and accesses any of the physical storage devices 1033 of the plurality of physical storage devices 1033 in accordance with the received access request. The access-targeted data (either write-targeted data or read-targeted data) is temporarily stored in the memory (for example, a cache memory) of the controller 1031.

The remote site 100R has a plurality of NAS servers 101R; a storage system 103R; and a management server 105. The plurality of NAS servers 101R and the management server 105 are connected via a second communication network (for example, a LAN) 110R. The second communication network 110R is connected to the third communication network 120. The plurality of NAS servers 101R and the management server 105 are connected to the storage system 103R. The storage system 103R is connected to the storage system 103L.

The NAS server 101R has substantially the same configuration as NAS server 101L. The NAS server 101R carries out communications with the NAS server 101L and the management server 105 by way of the NIC. The number of NAS servers 101R can be same as or different from the number of NAS servers 101L. In this embodiment, it is supposed that there are three NAS servers 101R and three NAS servers 101L.

The storage system 103R has substantially the same configuration as the storage system 103L. The configuration of the controller inside the storage system 103R can be the same as or different from the controller 103I inside the storage system 103L.

The management server 105 is one type of computer, and, for example, has a memory 1051; CPU 1052; NIC 1053; and HBA 1054. The NIC 1053 is connected to the second communication network 110R. The HBA 1054 is connected to the controller of the storage system 103R. The management server 105 can put an arbitrary NAS server 101R from among the plurality of NAS servers 101R in the power-saving mode (for example, either a power OFF mode or a power-saving mode) via the NIC 1053.

Figure 2:
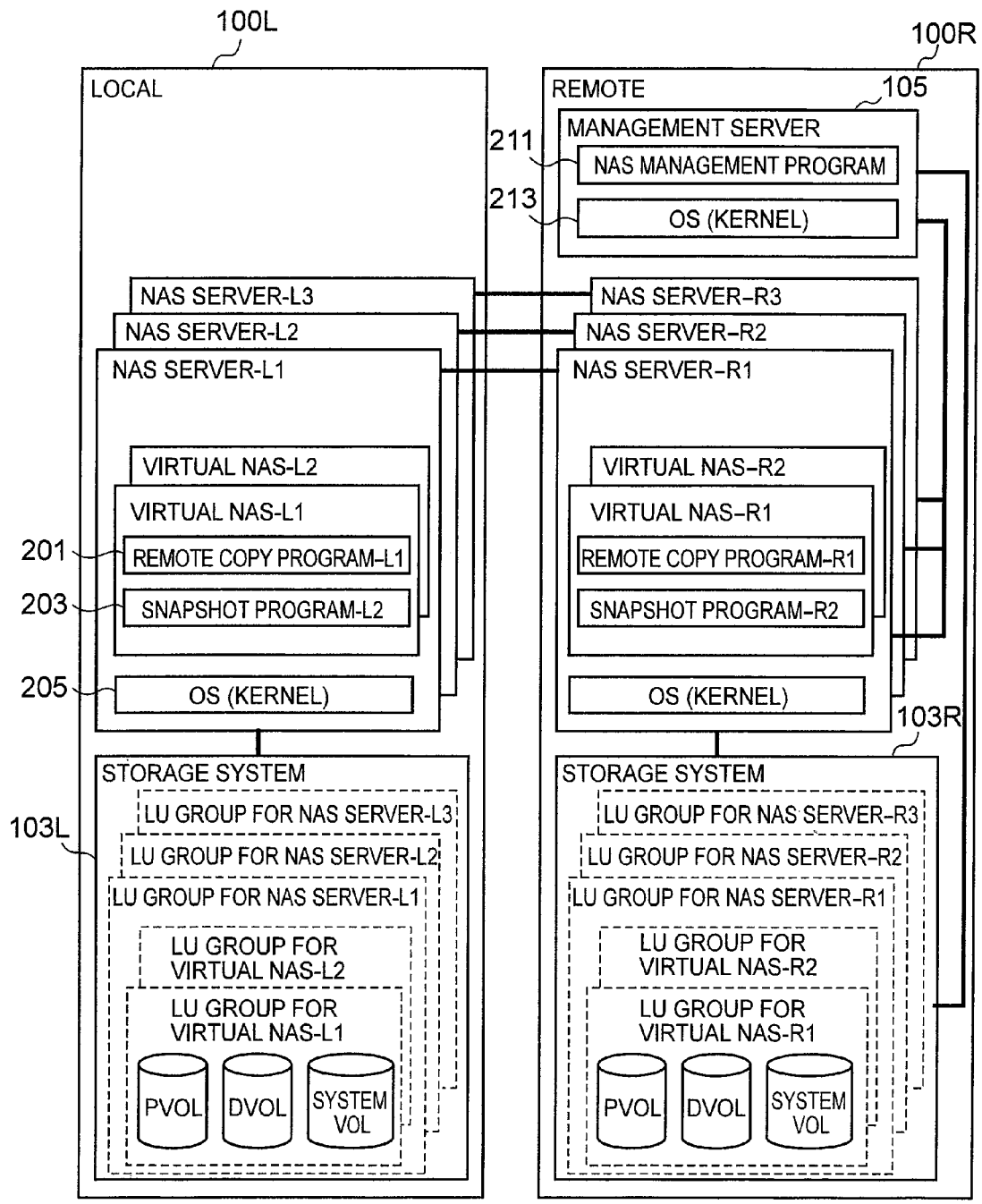
FIG. 2 shows the software configuration of the computer system related to one embodiment of the present invention.

FIG. 2 shows the software configuration of the computer system related to the one embodiment of the present invention. Furthermore, in the following explanation, the three NAS servers 101L will be referred to as "NAS server-L1", "NAS server-L2" and "NAS server-L3", and when no particular distinction is made between these three NAS servers 101L, the three servers will be referred to as "NAS server-L". Also, the three NAS servers 110R will be referred to as "NAS server-R1", "NAS server-R2" and "NAS server-R3", and when no particular distinction is made between these three NAS servers 101R, the three servers will be referred to as "NAS server-R". Further, when the term computer program is used as the subject of a sentence hereinbelow, in actuality, the processing is being carried out by the CPU that executes this computer program.

The respective NAS servers-L and the respective NAS servers-R have an OS (Operating System) 205 that controls a NAS server-L and a NAS server-R. In the respective NAS servers-L, one or more virtual NAS-L are operated by the OS 205 on the basis of the computer resources of the NAS server-L. Similarly, in the respective NAS servers-R, one or more virtual NAS-R are operated by the OS 205 on the basis of the computer resources of the NAS server-R. The virtual NAS-L and virtual NAS-R are virtual OS environments (virtual computers) constructed on top of the NAS server-L and NAS server-R to service the NAS.

Virtual NAS-L and virtual NAS-R are treated as a one-to-one pair. For example, in the case of this embodiment, virtual NAS-L1 and virtual NAS-R1 configure a first pair, and virtual NAS-L2 and virtual NAS-R2 configure a second pair. A data remote copy is carried out between a virtual NAS-L and a virtual NAS-R that configure a pair. Hereinafter, when no particular distinction is made between virtual NAS-L, virtual NAS-L will be referred to as "virtual NAS-Li" and a virtual NAS-R that configures a pair with the virtual NAS-Li will be referred to as "virtual NAS-Ri" (where i is a natural integer).

A remote copy program 201 and a snapshot program 203 are respectively executed in a virtual NAS-Li and a virtual NAS-Ri. Hereinbelow, the snapshot program 203 executed by the virtual NAS-Li will be referred to as "snapshot program-Li", and a remote copy program executed by the virtual NAS-Ri will be referred to as "remote copy program-Ri". Also, in addition, explanations will be given by appending "-Li" to the name of an element (for example, a PVOL, DVOL and snapshot management table) corresponding to a virtual NAS-Li, and, similarly, appending "-Ri" to the name of an element corresponding to a virtual NAS-Ri.

The snapshot program-Li (or snapshot program-Ri) acquires a still image (a snapshot) of a certain point in time of a PVOL-Li (or PVOL-Ri), which will be explained hereinbelow. A plurality of generations of snapshots are acquired by the snapshot program-Li (or snapshot program-Ri).

The remote copy program-Li transfers a snapshot acquired by the snapshot program-Li to the remote copy program-Ri.

The remote copy program-Ri notifies the snapshot program-Ri of the write destination for the transferred data. Consequently, a snapshot of a PVOL-Ri (a PVOL inside a LU group for a virtual NAS-Ri, which will be explained hereinbelow) that constitutes the access destination of the virtual NAS-Ri is acquired by the snapshot program-Ri.

A LU (Logical Unit) group is prepared for each NAS server-Li on the basis of the plurality of physical storage devices 1033 inside the storage system 103L. Then, the LU group for each NAS server-L comprises a LU group for each virtual NAS-Li. For example, the LU group for NAS server-L1 comprises an LU group for virtual NAS-L1 and a LU group for virtual NAS-L2 in order for virtual NAS-L1 and virtual NAS-L2 to be executed in NAS server-L1. The LU groups for the respective virtual NAS-Li comprise PVOL-Li, DVOL-Li and system VOL-Li. PVOL is the abbreviation for Primary Volume, and is the logical volume into which the latest data is written. DVOL is the abbreviation for Differential Volume, and is the logical volume that constitutes the save destination for updated old data when the PVOL is updated. The system VOL is the logical volume in which the virtual NAS-Li is stored. The virtual NAS-Li is read out from the system VOL-Li and booted up by the NAS server-L.

Figure 21:
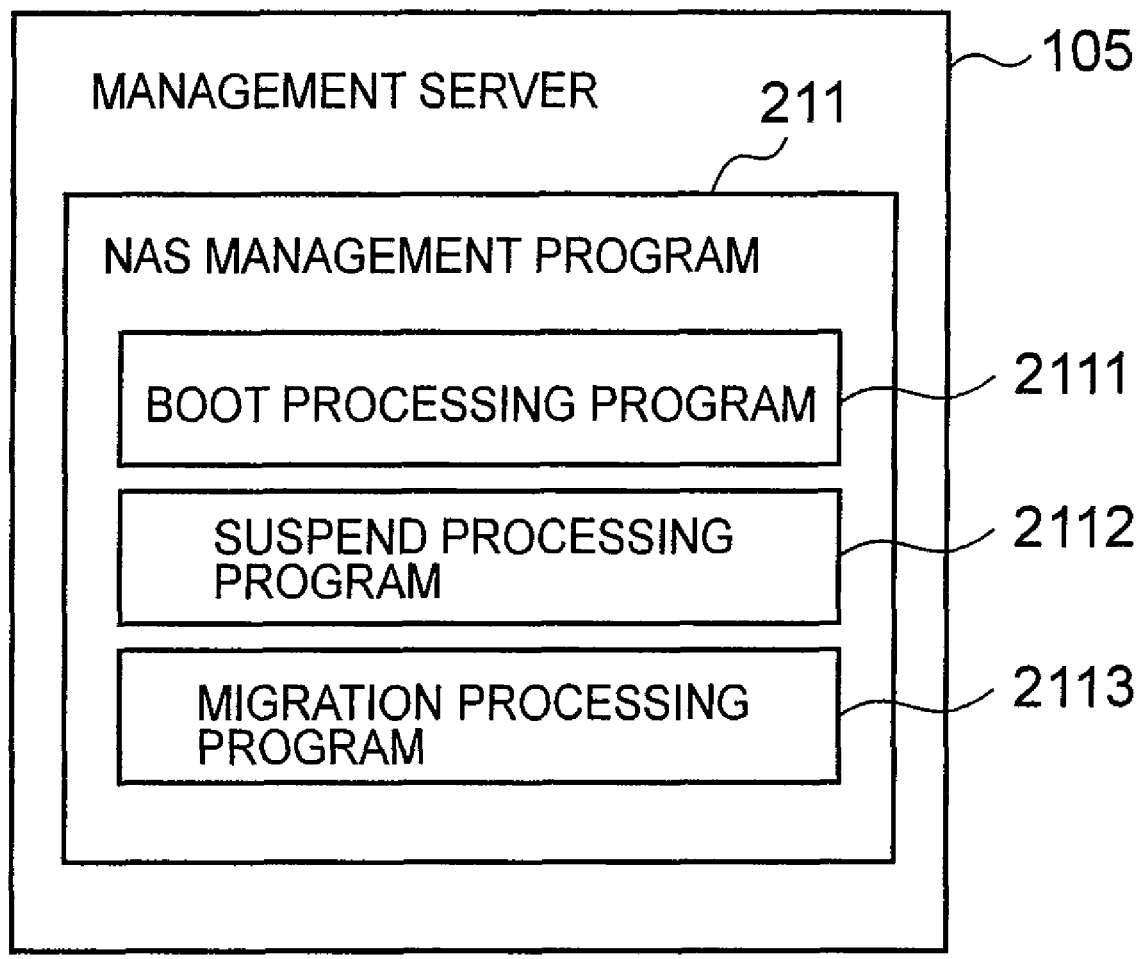
FIG. 21 shows an example of the configuration of a NAS management program.

A NAS management program 211 is executed on the OS 213 of a management server 105. The NAS management program 211 controls the migration of the virtual NAS-Ri and the suspend/boot of NAS server-Ri. For example, at a remote copy commencement time specified from a remote copy schedule, the NAS management program 211 releases the power-saving mode of the NAS server-R having the virtual NAS-Ri that is to carry out the remote copy, and when this remote copy ends, also transitions this NAS server-R to the power-saving mode. Specifically, as shown in FIG. 21, the NAS management program 211 has a boot processing program 2111 that boots the NAS server-R; a suspend processing program 2112 that puts the NAS server-R in the power-saving mode; and a migration processing program 2113 that migrates the virtual NAS-Ri. The respective programs 2111 through 2113 will be explained in detail further below.

The snapshot program-Li and snapshot program-Ri carry out a COW (Copy On Write) to acquire a snapshot. This COW will be explained hereinbelow. In the following explanation, to make the explanation easier to understand, the number of blocks that configure PVOL-Li and the number of blocks that configure DVOL-Li will be respectively set at eight (six of the eight blocks of the DVOL-Li are shown in the figure). Further, the blocks configuring the PVOL-Li will be referred to as "PVOL block-Li", the blocks configuring the DVOL-Li will be referred to as the "DVOL block-Li", and the blocks configuring a snapshot volume-LI (which, in this embodiment, is a virtual logical volume) will be referred to as "snapshot block-Li". Further, a block-Li corresponding to a block address n will be referred to as "block-Li#n" (where n is an integer larger than 0) for all PVOL block-Li, DVOL block-Li and snapshot block-Li.

As shown in FIG. 3A, it is supposed that block data "A" through "H" is stored in the eight PVOL block-Li. It is also supposed that block data is not stored in any of the eight DVOL block-Li.

The snapshot management table-Li is prepared. The snapshot management table-Li can be stored in an arbitrary storage resource, such as the memory inside the NAS server-L (and NAS server-R), but in this embodiment, is stored in a specific area inside the DVOL-Li (an area other than DVOL blocks 1 through 8).

The snapshot management table-Li records information showing which block of which logical volume, the PVOL-Li or the DVOL-Li, should be accessed when which snapshot block-Li of which snapshot volume-Li is the access destination. Specifically, the addresses of the respective PVOL block-Li, a bit showing whether or not a PVOL block-Li has undergone COW (hereinafter referred to as the "COW bit"), and the address of the COW save-destination block-Li (DVOL block-Li) for a PVOL block-Li are stored in the snapshot management table for each snapshot volume. More specifically, the snapshot management table-Li is configured from a block address column, a COW column, and three snapshot columns. The addresses of the respective PVOL block-Li are stored in the block address column. In the COW column, three COW bits corresponding to three snapshots are lined up for each PVOL block-Li. The three snapshot columns correspond to the three snapshots. That is, it is possible to manage a plurality of generations (three generations here) of snapshots by using one or more DVOL-Li.

Of the three consecutive COW bits, the COW bit on the far left corresponds to the first snapshot, the COW bit in the center corresponds to the second snapshot, and the COW bit on the far right corresponds to the third snapshot. A COW bit of "1" signifies that a COW has not been carried out yet, and a COW bit of "0" signifies that a COW has been completed.

The address of the save-destination block-Li of the PVOL block-Li is recorded in the snapshot column. If the save-destination block-Li is the DVOL block-Li, the address of the pertinent DVOL block-Li is recorded as the save-destination block-Li address, and if the save-destination block-Li is the PVOL block-Li (that is, a PVOL block-Li that has not undergone a COW), a value that signifies this fact (for example "null") is recorded as the save-destination block-Li address. When the save-destination block-Li address is "null", the PVOL block-Li is accessed. In the initial state, the save-destination block-Li address is "null" for all the snapshot block-Li of all the snapshot columns. This is because block data has not been saved by a COW.

Upon receiving a snapshot (SS-1) (hereinafter, will be referred to simply as "SS-1") acquisition request, the snapshot program-Li writes "SS-1" as the snapshot name in the leftmost snapshot column as shown in FIG. 3B, and updates all of the leftmost COW bits in the COW column of the snapshot management table-Li to ON ("1"). A COW is necessary when updating occurs in the PVOL block-Li corresponding to a COW bit that is ON.

Figures 4A, 4B:
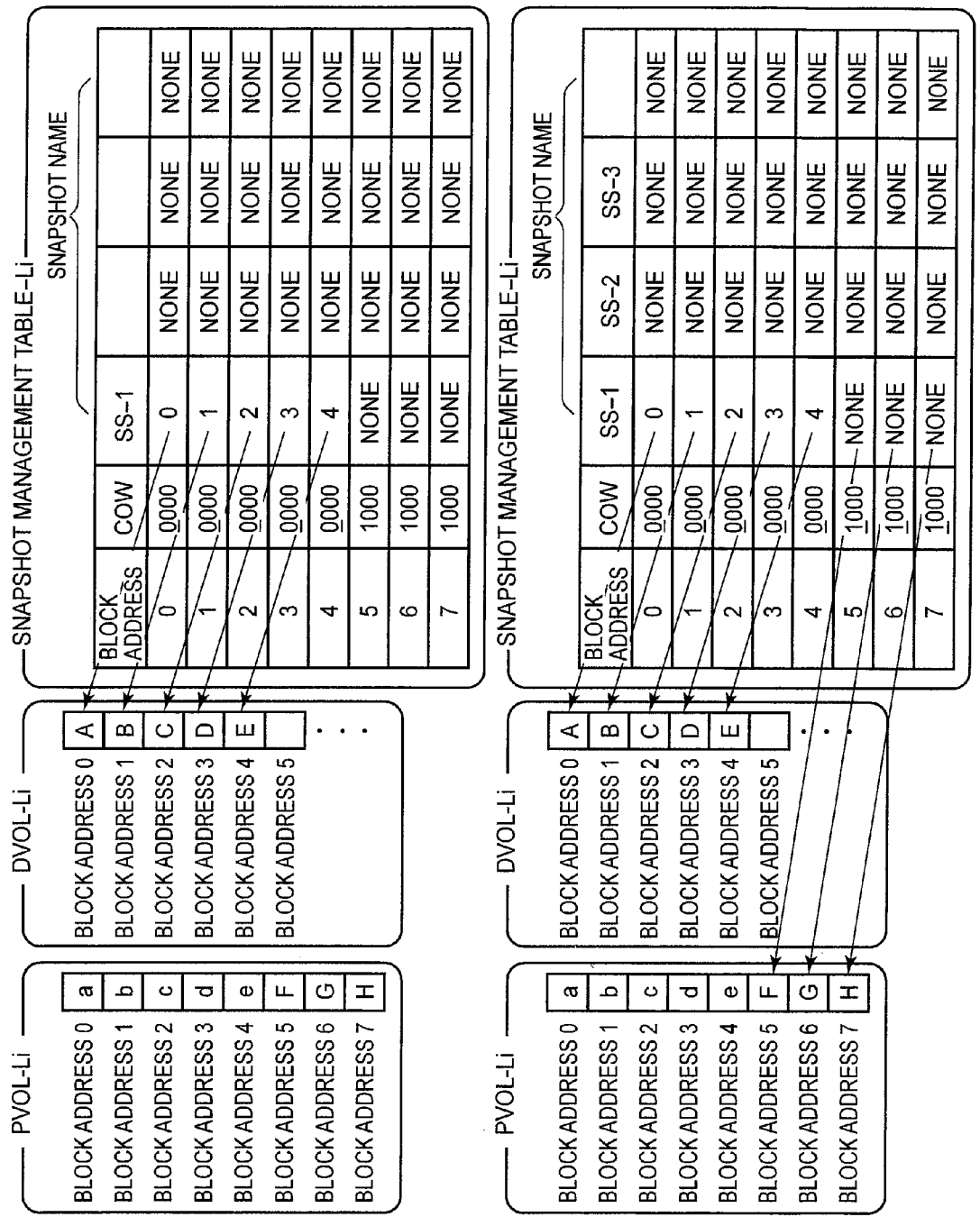
FIG. 4A shows a PVOL-Li, DVOL-Li and snapshot management table-Li when a PVOL-Li undergoes updating subsequent to the point in time at which a snapshot (SS-1) was acquired.
FIG. 4B shows how to recreate a snapshot (SS-1)

Next, it is supposed that the snapshot program-Li issues a write request for block data "a" through "e" to be written to PVOL block-Li #0 through #4 on the basis of an access command from the client device 102 as shown in FIG. 4A. In this case, the snapshot program-Li executes the processing of (4A-1) through (4A-4) below:

(4A-1) Writes address "0" through "4" of DVOL block-Li #0 through #4 as the save-destination block-Li addresses corresponding to PVOL block-Li #0 through #4 in the snapshot column of the snapshot (SS-1);

(4A-2) Saves block data "A" through "E", which is stored in PVOL block-Li #0 through #4, to DVOL block-Li #0 through #4;

(4A-3) Respectively updates the five COW bits on the far left, which correspond to PVOL block-Li #0 through #4, to OFF ("0"); and (4A-4) Writes block data "a" through "e" to PVOL block-Li #0 through #4.

Thereafter, a COW will not occur even for the SS-1 even if updating takes place in the PVOL block-Li #0 through #4 corresponding to the COW bits that are OFF.

A snapshot is acquired and managed as described hereinabove.

Upon receiving from the client 102 a snapshot reference request, the snapshot program-Li uses the snapshot management table-Li to specify, for the snapshot specified by this reference request, a PVOL block-Li and/or a DVOL block-Li in which is stored the block data that configures this specified snapshot. The snapshot program-Li reproduces the specified snapshot by reading out the block data from the specified PVOL block-Li and/or DVOL block-Li.

Specifically, for example, as shown in FIG. 4B, upon receiving a SS-1 reference request, the snapshot program-Li executes the processing of (4B-1) through (4B-4) below:

(4B-1) References the COW bit corresponding to the SS-1 in PVOL block-Li address order;

(4B-2) When the COW bit is OFF at the time of (4B-1), reads out the block data from the PVOL block-Li in which the COW bit is OFF, and when the COW bit is ON, reads out the block data from the save-destination block-Li (DVOL block-Li) corresponding to the PVOL block-Li in which the COW bit is ON (As a result of which, block data "A" through "E" is read out from DVOL block-Li #0 through #4, and block data "F" through "H" is read out from PVOL block-Li #5 through #7.); and (4B-3) Provides the client device with the snapshot volume-Li in which the SS-1, which is configured from the eight block data "A" through "H" that has been read out, exists.

Figure 5:
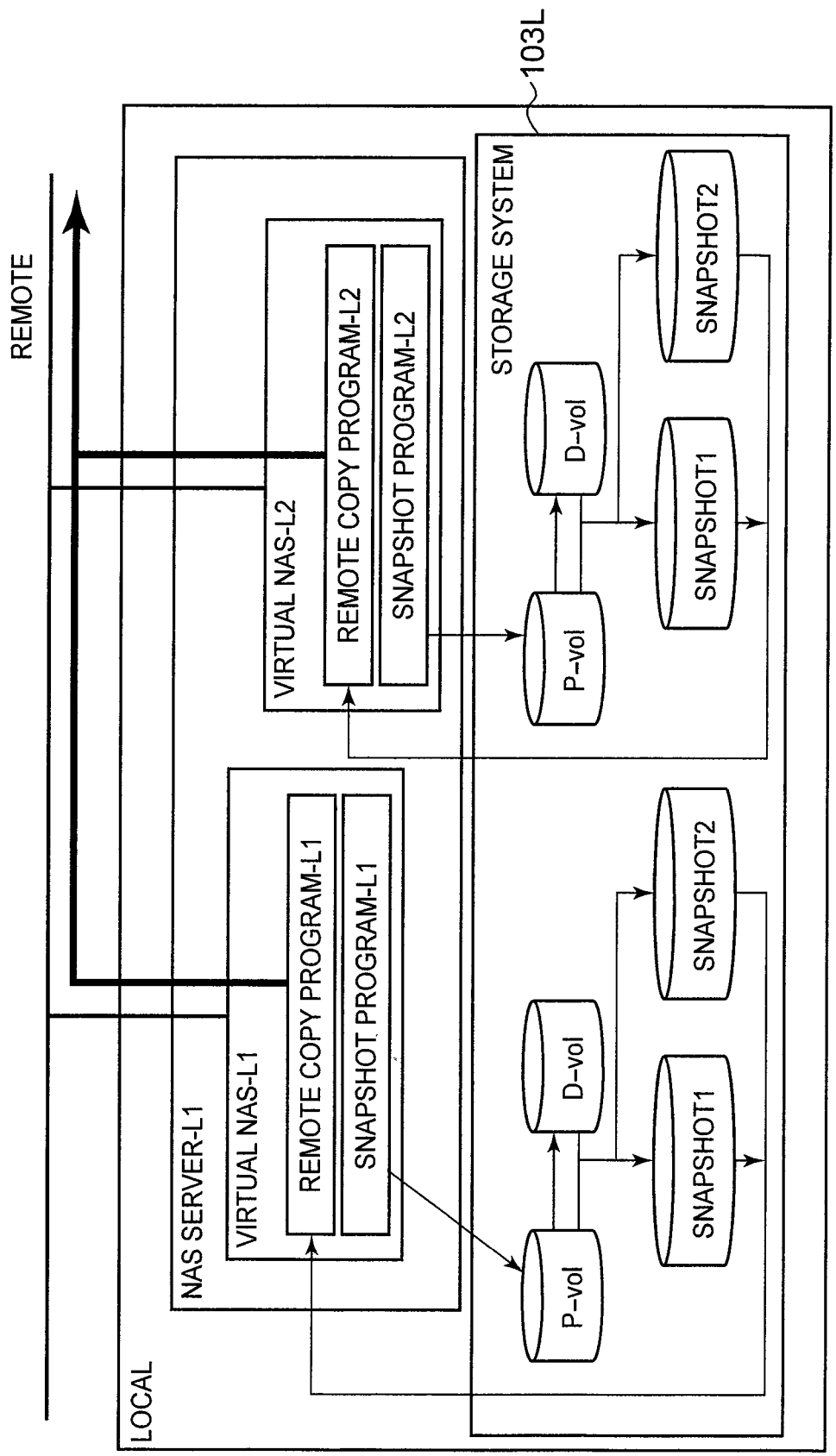
FIG. 5 shows an inter-snapshot difference being remote copied.
Figure 6:
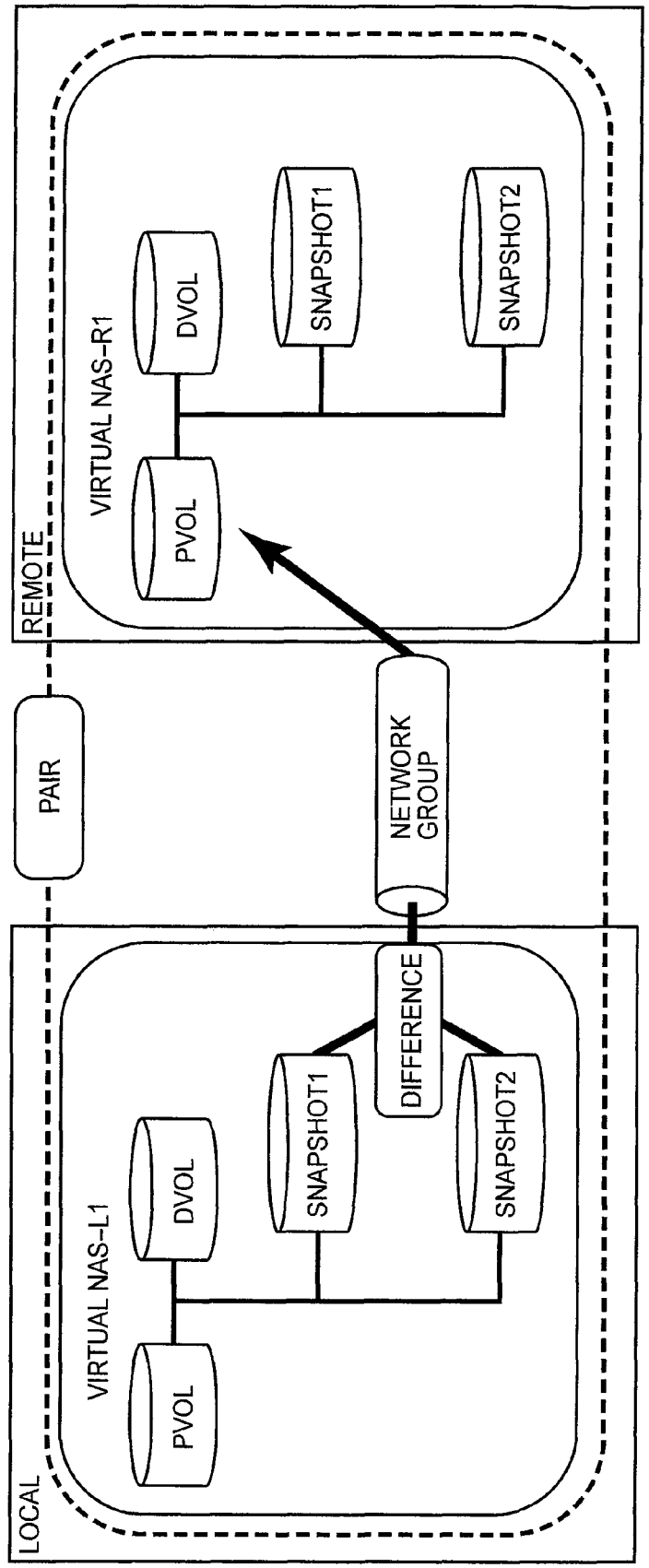
FIG. 6 shows a remote copy being carried out between a virtual NAS-Li and a virtual NAS-Ri (in FIG. 6, i=1)

As shown in FIG. 5, the snapshot program-Li (i=1, 2 in FIG. 5) of the local site 100L acquires (for example, either regularly or irregularly) a snapshot in accordance with a pre-set schedule (for example, a user-configured time interval). The remote copy program-Li extracts one or more block data (hereinafter, this block data will be referred to as "snapshot difference data") corresponding to an inter-snapshot difference (in the example of FIG. 5, the difference between snapshot 1 and the next generation snapshot 2), and transfers the extracted snapshot difference data and a copy request that specifies a copy destination (for example, a PVOL ID and a PVOL block address) to the remote copy program-Ri. The copy destination is a PVOL block-Ri. The extracted snapshot difference data is sent to remote copy program-Ri by way of a network group (the first through the third communication networks 110L, 120 and 110R) as shown in FIG. 6, and stored in the copy-destination PVOL block-Ri. The PVOL-Ri ID (for example, a LUN (Logical Unit Number) is recorded in the computer resource (for example, one storage area inside the memory 101) operated by the virtual NAS-Li. The remote copy program-Li can specify this ID and the PVOL block-Li address corresponding to the snapshot difference data as the copy destination. The PVOL block-Li corresponding to the snapshot difference data is either the PVOL block-Li stored in the snapshot difference data, or the PVOL block-Li corresponding to the DVOL block-Li in which the snapshot difference data is stored.

The remote copy program-Ri notifies the snapshot program-Ri of the copy destination specified by the copy request. For example, when the snapshot difference data between snapshot 1 and snapshot 2 is to be written (that is, when snapshot 2 is to be acquired anew), the snapshot program-Ri executes the following (6-1) through (6-5):

(6-1) Writes the save-destination block-Ri address corresponding to the copy-destination PVOL block-Ri to the SS-1 snapshot column inside the snapshot management table-Ri;

(6-2) Saves the block data stored in the copy-destination PVOL block-Ri to the above-mentioned save-destination block-Ri;

(6-3) Updates the left-most COW bit, which corresponds to the copy-destination PVOL block-Ri, to OFF ("0")

(6-4) Writes the snapshot difference data that the remote copy program-Ri received from the remote copy program-Li to the copy-destination PVOL block-Ri; and (6-5) Adds SS-2 to a snapshot column inside the snapshot management table-Ri.

Consequently, as shown in FIG. 6, snapshots 1 and 2, which are the same snapshots 1 and 2 managed by virtual NAS-Li can be managed by virtual NAS-Ri (that is, snapshots 1 and 2 have been remote copied.).

The total amount of snapshot difference data in virtual NAS-Li will differ in accordance with the amount of file updates from the client device 102 within the snapshot acquisition period. The amount of data transfers from virtual NAS-Li to virtual NAS-Ri and the length of time required for remote copy will depend on the total amount of snapshot difference data.

There are two types of difference data for the virtual NAS-LI taken into account in the processing of this embodiment. The first is the above-mentioned snapshot difference data, which is the difference on the local side only, that is, the difference between snapshots (between a snapshot and the subsequent snapshot). The second is the difference between the local and the remote sides, specifically, data corresponding to PVOL-Li and DVOL-Li, and PVOL-Ri and DVOL-Ri (hereinafter, local/remote difference data).

The method for determining the local/remote difference data will be explained here. Furthermore, for the following explanation, the snapshot management table-Li and snapshot management table-Ri have cells for holding the values that show the differences between respective snapshots (a value showing the number of times a COW has occurred, in other words, the number of snapshot difference data).

For example, it is supposed that PVOL-Li, DVOL-Li and snapshot management table-Li, and PVOL-Ri, DVOL-Ri and snapshot management table-Ri are as shown in FIG. 7A. That is, it is supposed that the state is such that PVOL-Li, DVOL-Li and snapshot management table-Li have been copied to the remote site 100R as the initial copy. According to FIG. 7A, SS-1 has been acquired for both virtual NAS-Li and virtual NAS-Ri.

Thereafter, when five COW operations occur for SS-1, and SS-2 is acquired for virtual NAS-Li, snapshot management table-Li is updated to the table-Li shown in FIG. 7B. That is, 5 is written to snapshot management table-Li as the value that shows the difference between SS-1 and SS-2. Specifically, for example, the remote copy program-Li specifies that COW operations have occurred five times between SS-1 and SS-2 by mutually comparing the COW bit columns corresponding to SS-1 and SS-2, and writes 5 to the snapshot management table-Li as the value that shows the difference between SS-1 and SS-2.

Thereafter, the remote copy program-Li acquires the snapshot management table-Ri (refer to FIG. 8A). Specifically, for example, the management server 105 acquires snapshot management table-Ri from either virtual NAS-Ri or DVOL-Ri, and sends the acquired snapshot management table-Ri to virtual NAS-Li. Or, the remote copy program-Ri sends snapshot management table-Ri to remote copy program-Li.

Remote copy program-Li specifies the local/remote difference data by comparing snapshot management table-Li (refer to FIG. 7B) and snapshot management table-Ri (refer to FIG. 8A). Specifically, when the remote copy program-Li compares the COW bits of the leftmost columns, block addresses 0 through 4 do not coincide. Since this is due to the occurrence of COW, the local/remote difference data for SS-1 constitutes block data "x", "y", "c", "d" and "e" inside the PVOL. Next, upon checking the COW bits of the second column from the left in address order, since a COW did not occur, it is clear that local/remote difference data has not been generated for SS-2. Accordingly, the specified local/remote difference data is as follows.

SS-1: Block data "x", "y", "c", "d" and "e" stored in PVOL block-Li #0 through #4;

SS-2: None (only snapshot name).

The above-mentioned block data "x", "y", "c", "d" and "e" also corresponds to snapshot difference data as the difference between SS-1 and SS-2 for virtual NAS-Li. Therefore, block data "x", "y", "c", "d" and "e" is remote copied to PVOL block-Ri #0 through #4, and a notification is made that there are no difference for SS-2. For this reason, the processing of (8B-1) and (8B-2) below is carried out by virtual NAS-Ri on the remote side.

(8B-1) Generates COW for PVOL block-Ri #0 through #4; and (8B-2) Acquires a second snapshot, the snapshot name of which is "SS-2".

Thus, the snapshot management table-Ri is updated as shown in FIG. 8B. However, the save-destination of the COW block data does not necessarily have to be the block of the same address.

The local/remote difference data is specified and a snapshot is remote copied as described hereinabove.

Now then, in this embodiment, the following six steps are generally carried out.

Step 1: Initial copy;

Step 2: A virtual NAS-Ri migration based on the date-time and length of time of the transfer and the amount of snapshot difference data;

Step 3: NAS server-R suspend (transition to power-saving mode);

Step 4: Reception of snapshot management table-Ri, and computation of total amount of local/remote difference data;

Step 5: NAS server-R boot; and

Step 6: Remote copy to virtual NAS-Ri inside booted NAS server-R.

The respective steps will be explained hereinbelow.

<Step 1: Initial Copy>

Figure 9:
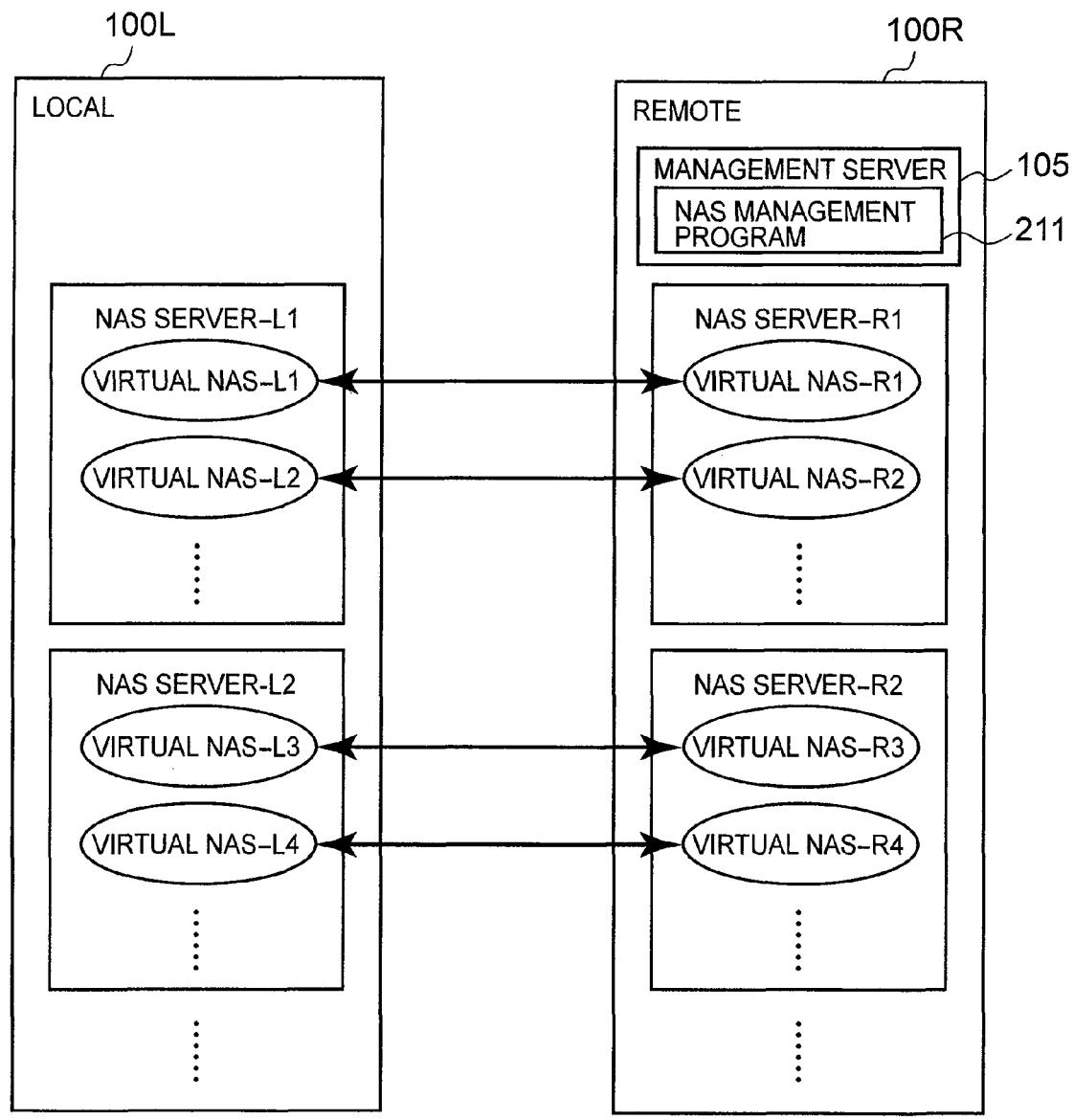
FIG. 9 shows Step 1: initial state prior to an initial copy.

It is supposed that the state shown in FIG. 9 is the initial state. That is, virtual NAS-L1 and virtual NAS-L2 are operating in the NAS server-L1, and virtual NAS-L3 and virtual NAS-L4 are operating in NAS server-L2. In the meantime, virtual NAS-R1 and virtual NAS-R2 are operating in NAS server-R1, and virtual NAS-R3 and virtual NAS-R4 are operating in NAS server-R2. Then, the respective PVOL-Li and DVOL-Li are copied to the respective PVOL-Ri and DVOL-Ri (that is, an initial copy is carried out), thereby creating a state in which the contents of the respective PVOL-Li and DVOL-Li and the contents of the respective PVOL-Ri and DVOL-Ri are the same.

<Step 2: Migration of Virtual NAS-Ri Based on Date/Time and Length of Time of Transfer and Total Amount of Snapshot Difference Data>

The NAS management program 211 inside the management server 105 executes the processing of (S2-1) through (S2-3) below.

Figure 10:
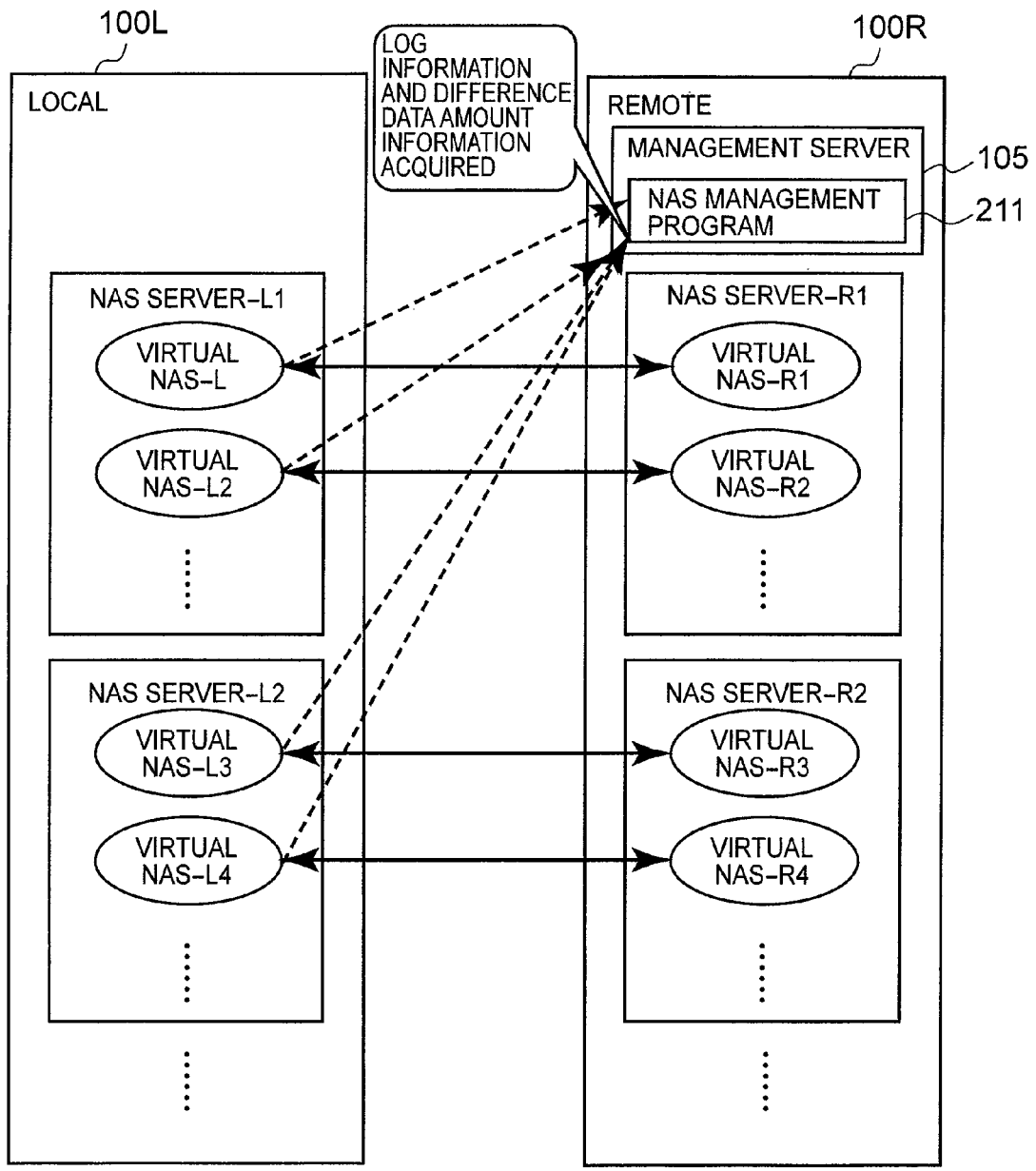
FIG. 10 shows respective NAS-Li sending log information and difference data quantity information to a management server.
Figure 11:
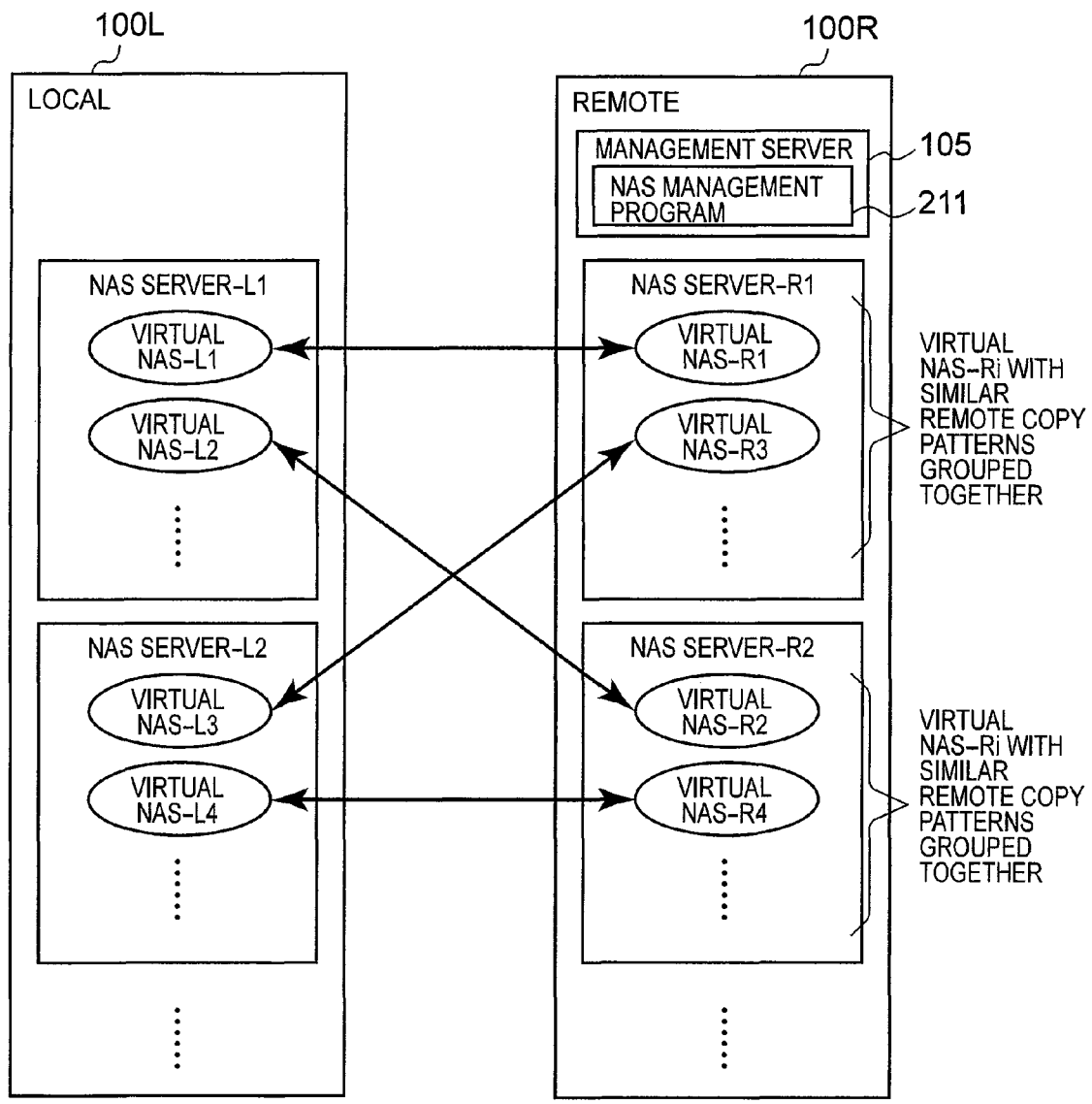
FIG. 11 shows the grouping of a plurality of virtual NAS-Ri.

(S2-1) As shown in FIG. 10, acquires log information and difference data amount information from the respective virtual NAS-L;

(S2-2) As shown in FIG. 11, classifies a plurality of virtual NAS-R into two or more groups configured by two or more virtual NAS-R that respectively configure pairs with two or more virtual NAS-L having similar remote copy patterns (both the copy start date/time, copy end date/time and transfer time specified from the log information, and the amount of snapshot difference data specified from the difference data amount information);

(S2-3) Selects a group from among two or more groups;

(S2-4) Selects from among a plurality of NAS server-R a NAS server-R that has hardware specifications that enable two or more NAS-R belonging to the selected group to operate; and (S2-5) As shown in FIG. 11, when a certain virtual NAS-R inside the group selected in (S2-3) exists in a NAS server-R that differs from the NAS server-R selected in (S2-4), migrates the above-mentioned certain virtual NAS-R from the different NAS server-R to the above-mentioned selected NAS server-R.

After the migration has ended, remote copies of snapshots are carried out in parallel between the plurality of virtual NAS-Ri that reside in the same NAS server-R and the plurality of virtual NAS-Li that configure pairs therewith. Further, only virtual NAS-R having similar remote copy patterns defined by transfer date/time, length of transfer time, and amount of snapshot difference data exist in the same NAS server-R. As a result of these similar remote copy patterns, the remote copy start date/time and end date/time for all the virtual NAS-Ri residing in the same NAS server-R approximate one another, thereby making it possible to lengthen as much as possible the time that this NAS server-R can be in a suspend state.

A number of aspects of this Step 2 will be explained in detail hereinbelow.

<<Transfer Date/Time and Length of Time, and Amount of Snapshot Difference Data>>

The "Transfer Date/Time" for virtual NAS-Li and virtual NAS-Ri here is the start date/time and/or end date/time of a snapshot transfer (transfer of a snapshot difference data group) from the virtual NAS-Li to the virtual NAS-Ri, and the "Length of transfer time" is the length of time between the start date/time and the end date/time. The transfer date/time and length of time can be discerned on the basis of the log information outputted by the respective remote copy programs-Li.

FIG. 12A through FIG. 12D show log information and difference data amount information respectively acquired from virtual NAS-L1 through virtual NAS-L4.

In the log information, there is recorded the date/time of a copy start (snapshot transfer start) and the date/time of a copy end (snapshot transfer end) for each remote copy. The transfer date/time and length of time for each remote copy is discerned from the respective log information.

The difference data amount information comprises information that shows the total amount of snapshot difference data (the amount of snapshot difference data) that exists between the latest copied snapshot (base-point snapshot) and the copy-targeted snapshot (for example, the generation snapshot subsequent to the base-point snapshot).

The above-mentioned log information and difference data amount information is sent to the NAS management program 211 inside the management server 105 from the respective remote copy programs-Li. The NAS management program 211 divides the virtual NAS-Ri into groups on the basis of the log information and the difference data amount information. Furthermore, log information is also outputted from the respective remote copy programs-Ri, but as will be explained hereinbelow, since the NAS server-R can be set to the power-saving mode, and the respective NAS-Ri residing in the NAS server-R can be suspended, there is the likelihood that it will not be possible to acquire the log information from the remote copy program-Ri. Thus, as described hereinabove, it is considered preferable that the log information be collected from the respective remote copy programs-Li.

Further, the transfer date/time and length of transfer time can also be discerned on the basis of a remote copy schedule (for example, the execution date/time of a remote copy executed at a fixed time), which is configured beforehand for the respective remote copy programs-Ri, and/or a snapshot acquisition schedule (for example, the execution date/time of a snapshot acquisition executed at a fixed time), which is configured in advance for the respective snapshot programs-Li, either in addition to or instead of the log information. That is, in this embodiment, a remote copy is commenced by the remote copy program-Ri sending a copy request to the remote copy program-Li at a fixed time based on a pre-configured remote copy schedule. However, the present invention is not limited to this, and, for example, a remote copy schedule can be configured in advance on the virtual NAS-Li side, and the remote copy program-Li can commence a copy based on this schedule without receiving a copy request from the remote copy program-Ri.

<<Migration of Virtual NAS-Ri>>

Figures 13, 14:
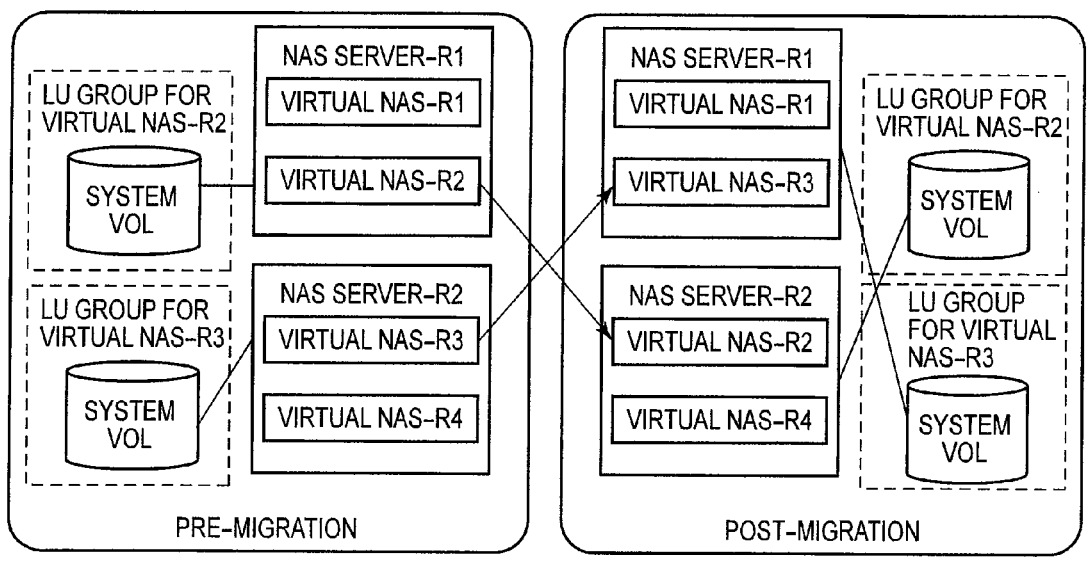
FIG. 13 is a schematic diagram of the migration of virtual NAS-R2 and virtual NAS-R3.
FIG. 14 shows an example of the configuration of a specifications table.

Referring to FIG. 13, when the migration target is a virtual NAS-Ri, the virtual NAS-Ri is virtual NAS-R1, the migration source is NAS server-R1, and the migration destination is NAS server-R2, the NAS management program 211 executes the processing of (S2A-1) through (S2A-3) below:

(S2A-1) Suspends virtual NAS-R2;

(S2A-2) Switches connection destination of the system LU in which the virtual NAS-R2 is stored from NAS server-R1 to NAS server-R2; and (S2A-3) Boots virtual NAS-R2 in the NAS server-R2. Consequently, the virtual NAS-R2 is read out to NAS server-R2 from the system LU connected to NAS server-R2 in (S2A-2), making it possible for virtual NAS-R2 to operate on NAS server-R2 (In addition, in FIG. 13, virtual NAS-R3 is migrated from NAS server-R2 to NAS server-R1.).

<<Select NAS Server-R in (S2-4)>>

In (S2-4) described hereinabove, NAS server-R is selected on the basis of the specifications table 1300 given as an example in FIG. 14. According to the table 1300 shown in FIG. 14, the maximum capacity (the maximum number of virtual NAS-R capable of being operated) and the capacity (the number of virtual NAS-R currently in operation) of virtual NAS-R are recorded for each NAS server-R. The NAS management program 211 selects in (S2-4) the NAS server-R that has a maximum capacity that is greater than the number k (where k is a natural integer) of virtual NAS-R that belong to the group selected in (S2-3). The NAS management program 211 adds the above-mentioned k to the capacity (the capacity recorded in the specifications table 1300) corresponding to the selected NAS server-R at an arbitrary timing, for example, when the above-mentioned migration has ended.

<Step 3: Suspend NAS server-R (Transition to Power-Saving Mode)>

Figure 15:
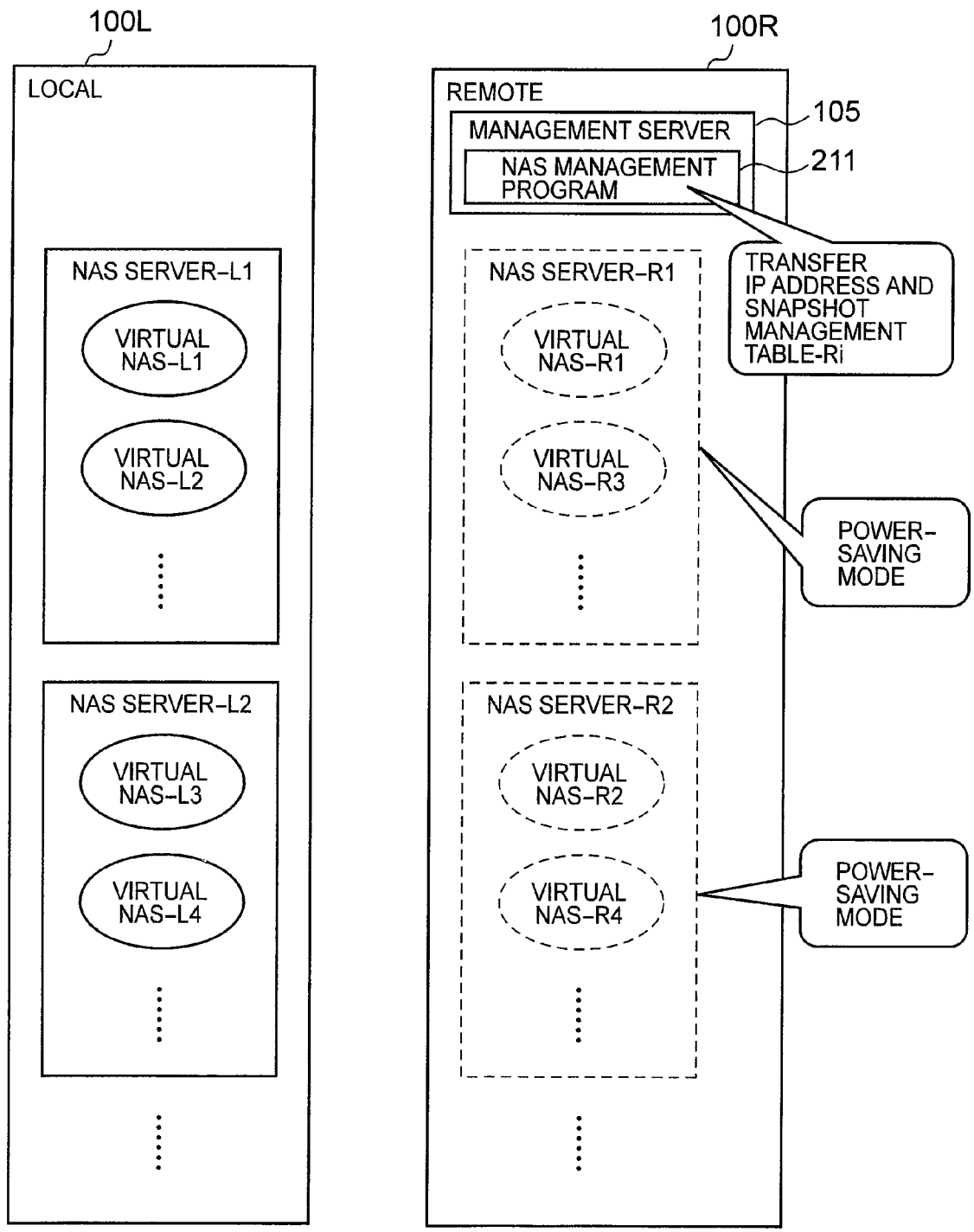
FIG. 15 shows the transfer of the virtual NAS-Li IP address and the snapshot management table-Ri, and the transition of the NAS server R to the power-saving mode.

When remote copies to all the virtual NAS-Ri residing in a certain NAS server-R have ended, the NAS management program 211 executes a transfer process and a suspend process for this certain NAS server-R as shown in FIG. 15. In the transfer process, the processing of the following (3A-1) through (3A-3) is executed:

(3A-1) Transfers to the NAS management program 211 from the respective virtual NAS-Ri that reside in the suspend-targeted NAS server-R (the above-mentioned certain NAS server-R) the IP addresses that the respective virtual NAS-Ri use to communicate with the respective virtual NAS-Li;

(3A-2) Transfers to the management server 105 the paths, which are linked to the suspend-targeted NAS server-R, and which lead to the respective DVOL-Ri corresponding to the respective virtual NAS-Ri (the respective DVOL-Ri are connected to the management server 105); and (3A-3) The NAS management program 211 acquires the respective snapshot management table-Ri from the respective DVOL-Ri connected to the management server 105. In the suspend process, the NAS management program 211 executes the processing of (3B-1) through (3B-2) for the suspend-targeted NAS server-R:

(3B-1) Suspends all the virtual NAS-Ri residing in the suspend-targeted NAS server-R (ends); and (3B-2) Suspends the suspend-targeted NAS server-R (transitions the suspend-targeted NAS server-R to power-saving mode).

<Step 4: Send Snapshot Management Table-Ri, and Compute Total Local/Remote Difference Data>

Figure 16:
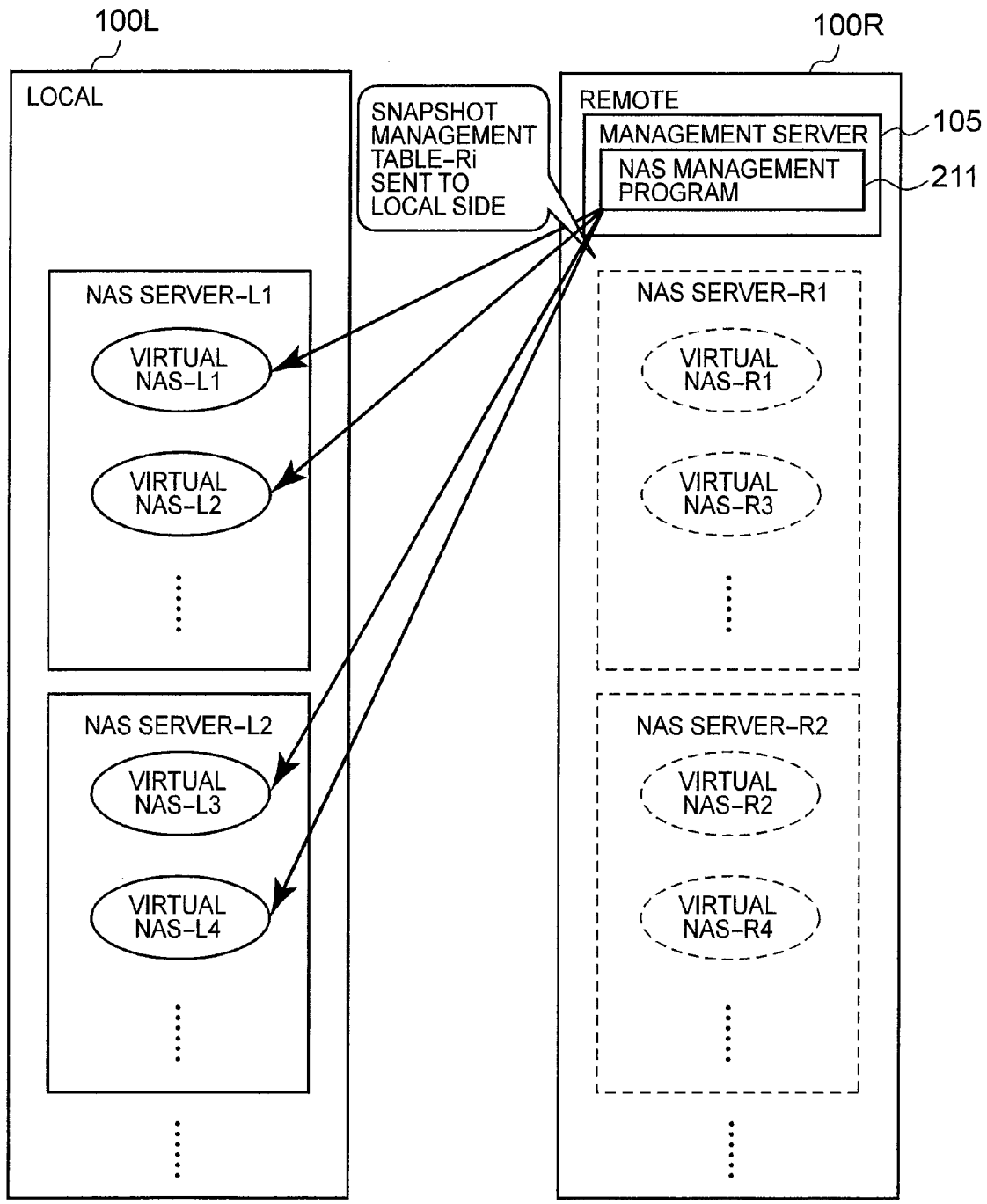
FIG. 16 shows the sending of the snapshot management table-Ri to the virtual NAS-Li that corresponds to the suspended virtual NAS-Ri.
Figure 17:
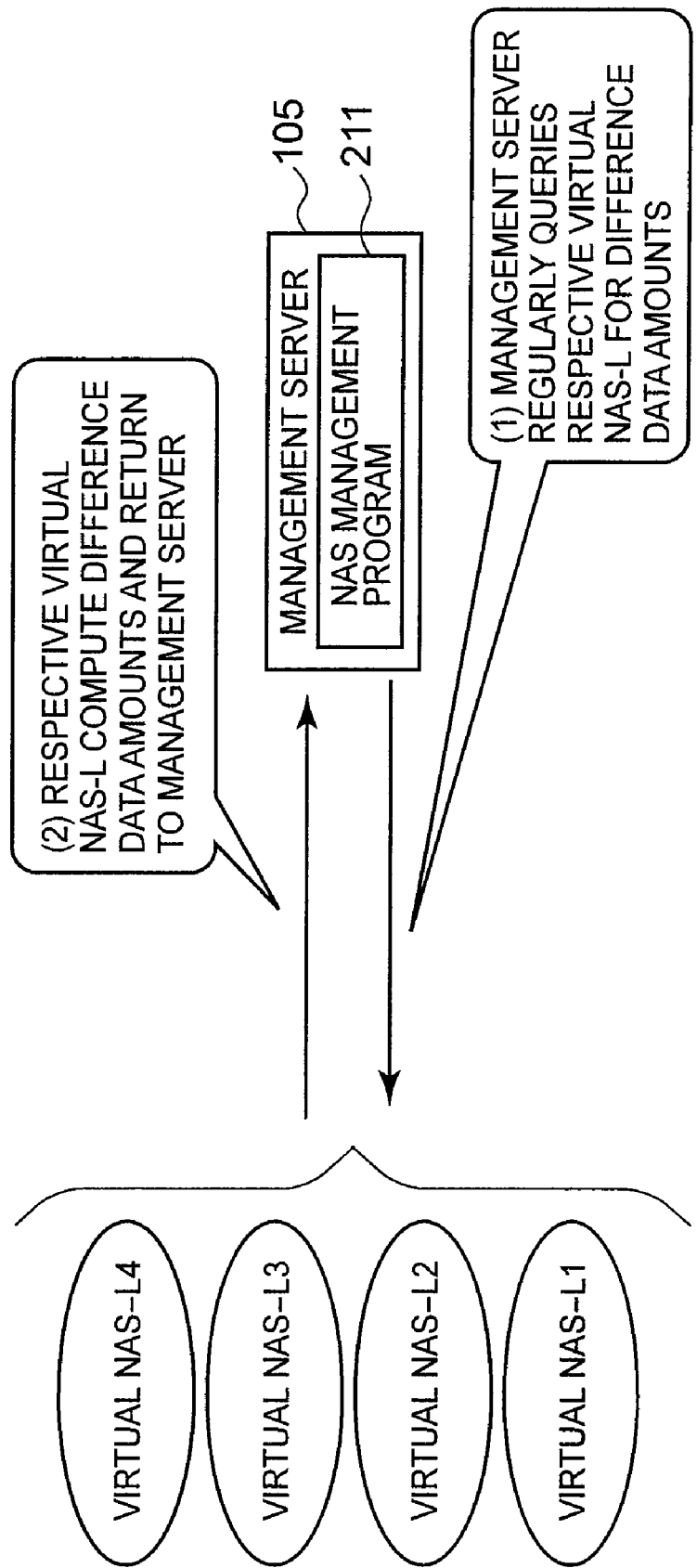
FIG. 17 shows a local/snapshot difference data quantity computed by the virtual NAS-Li being notified to the NAS management program.

In Step 4, the processing of the following (4-1) through (4-4) is executed:

(4-1) As shown in FIG. 16, the NAS management program 211 uses the IP address acquired in the above-mentioned (3A-1) (the IP address of the virtual NAS-Li that configures a pair with the suspended virtual NAS-Ri) to send the snapshot management table-Ri corresponding to the suspended virtual NAS-Ri (the snapshot management table-Ri acquired in the above-mentioned (3A-3)) to the virtual NAS-Li that configures a pair with the suspended virtual NAS-Ri (In FIG. 16, for example, the snapshot management table-R2 corresponding to the virtual NAS-R2 is sent only to virtual NAS-L2, and is not sent to other virtual NAS-L);

(4-2) As shown in FIG. 17, the NAS management program 211 regularly queries the respective virtual NAS-Li about the amount of local/remote difference data;

(4-3) As shown in FIG. 17, the virtual NAS-Li that receives the query about the amount of local/remote difference data uses the above-mentioned method to compute the amount of local/remote difference data (specifically, computes the amount of local/remote difference data by comparing the snapshot management table-Ri received in Step 4 against the latest snapshot management table-Li), and returns the computed local/remote difference data amount to the NAS management program 211; and (4-4) The NAS management program 211 computes the total local/remote difference data on the basis of the amount of local/remote difference data from the respective virtual NAS-Li.

Figure 18:
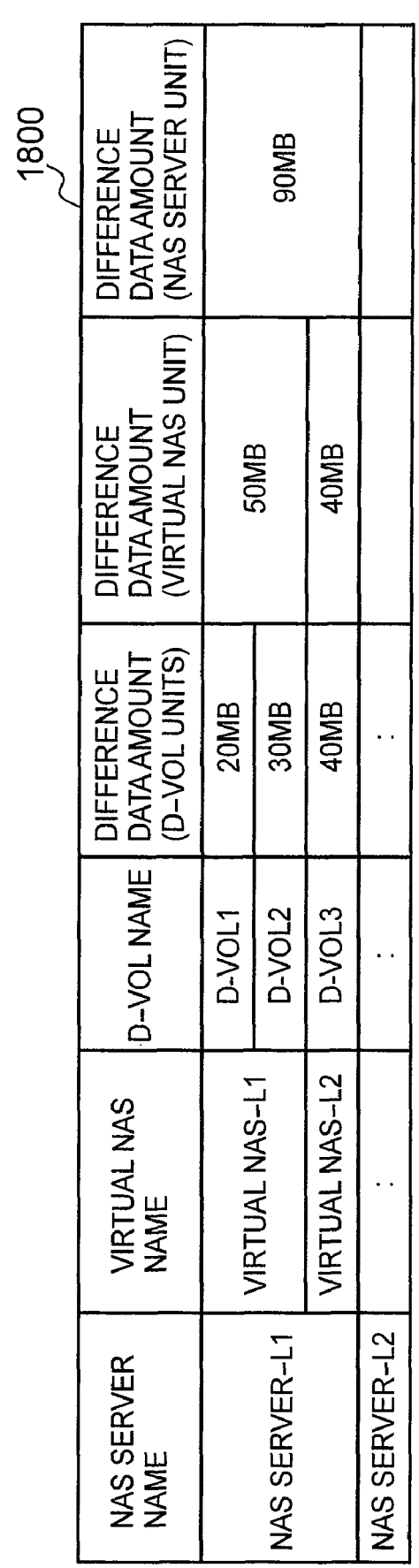
FIG. 18 shows an example of the configuration of a difference data quantity table.

The computational results, for example, are recorded in a difference data amount table 1800 as shown in FIG. 18. According to this table 1800, the amount of local/remote difference data is recorded in DVOL units, virtual NAS-R units and NAS server-R units for each NAS server-L. For example, which virtual NAS-L resides in which NAS server-L is managed by this table 1800, and this table 1800 is updated every time the local/remote difference data amount is returned. The local/remote difference data amount, for example, is returned in DVOL units, and the amount of local/remote difference data is totaled for each DVOL, thereby revealing the total local/remote difference data in virtual NAS-R units and the total local/remote difference data in NAS server-R units.

Furthermore, instead of the snapshot management table-Ri being sent to the remote copy program-Li, the snapshot management table-Li can be sent to the NAS management program 211 from the remote copy program-Li, and the NAS management program 211 can compute the amount of local/remote difference data by comparing these two tables, snapshot management table-Li and snapshot management table-Ri. That is, instead of the remote copy program-Li, the NAS management program 211 can compute the amount of local/remote difference data. However, in this mode, it could be necessary for the remote copy program-Li to send the snapshot management table-Li to the NAS management program 211 every time the snapshot management table-Li is updated, thereby possibly giving rise to overhead problems. Thus, instead of this mode, it is considered preferable that the remote copy program-Li receive the snapshot management table-Ri and compute the amount of local/remote difference data as in this embodiment.

<Step 5: Boot NAS Server-R>

Figure 19:
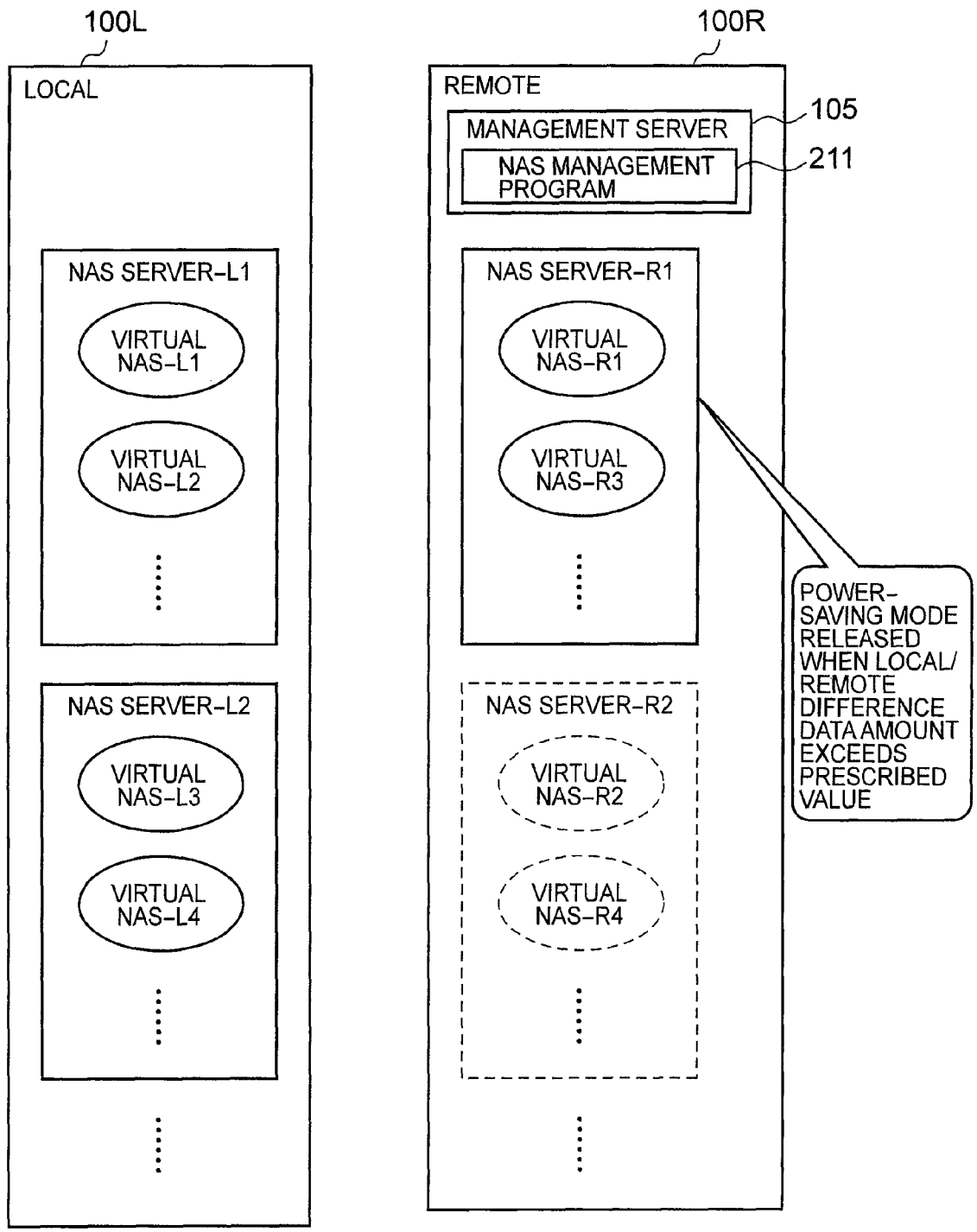
FIG. 19 shows the release of the power-saving mode for a NAS server related to a local/remote difference data total quantity that exceeds a prescribed value, and the maintenance of the power-saving mode for the NAS server-R related to a local/remote difference data total quantity that does not exceed the prescribed value.

When the total local/remote difference data in virtual NAS-R units exceeds a first prescribed value, and/or when the total local/remote difference data in NAS server-R units exceeds a second prescribed value, as shown in FIG. 19, the NAS management program 211 boots NAS server-R1, which is related to the total that exceeds the first and/or second prescribed values (releases the power-saving mode of NAS server-R1). Furthermore, when the NAS server-R1 is booted, all the virtual NAS-R1 and virtual NAS-R3 residing in the NAS server-R1 can also be booted, but, for example, when virtual NAS-R3 is the only virtual NAS-R for which the total local/remote difference data in virtual NAS-R units exceeds the first prescribed value (in other words, when virtual NAS-R3 is the only virtual NAS-R for which a remote copy is needed), only the virtual NAS-R3 can be booted. Further, it is supposed here that NAS server-R2 is suspended as-is (in the power-saving mode as-is) because the total local/remote difference data in virtual NAS-R units does not exceed the first prescribed value, and/or the total local/remote difference data in NAS server-R units does not exceed the second prescribed value. Further, the first prescribed value can be a value that is common to a plurality of virtual NAS-R, or a value that is different for each virtual NAS-R. Similarly, the second prescribed value can be a value that is common to a plurality of NAS server-R, or a value that differs for each NAS server-R.

<Step 6: Remote Copy to Virtual NAS-Ri Inside Booted NAS Server-R>

Figure 20:
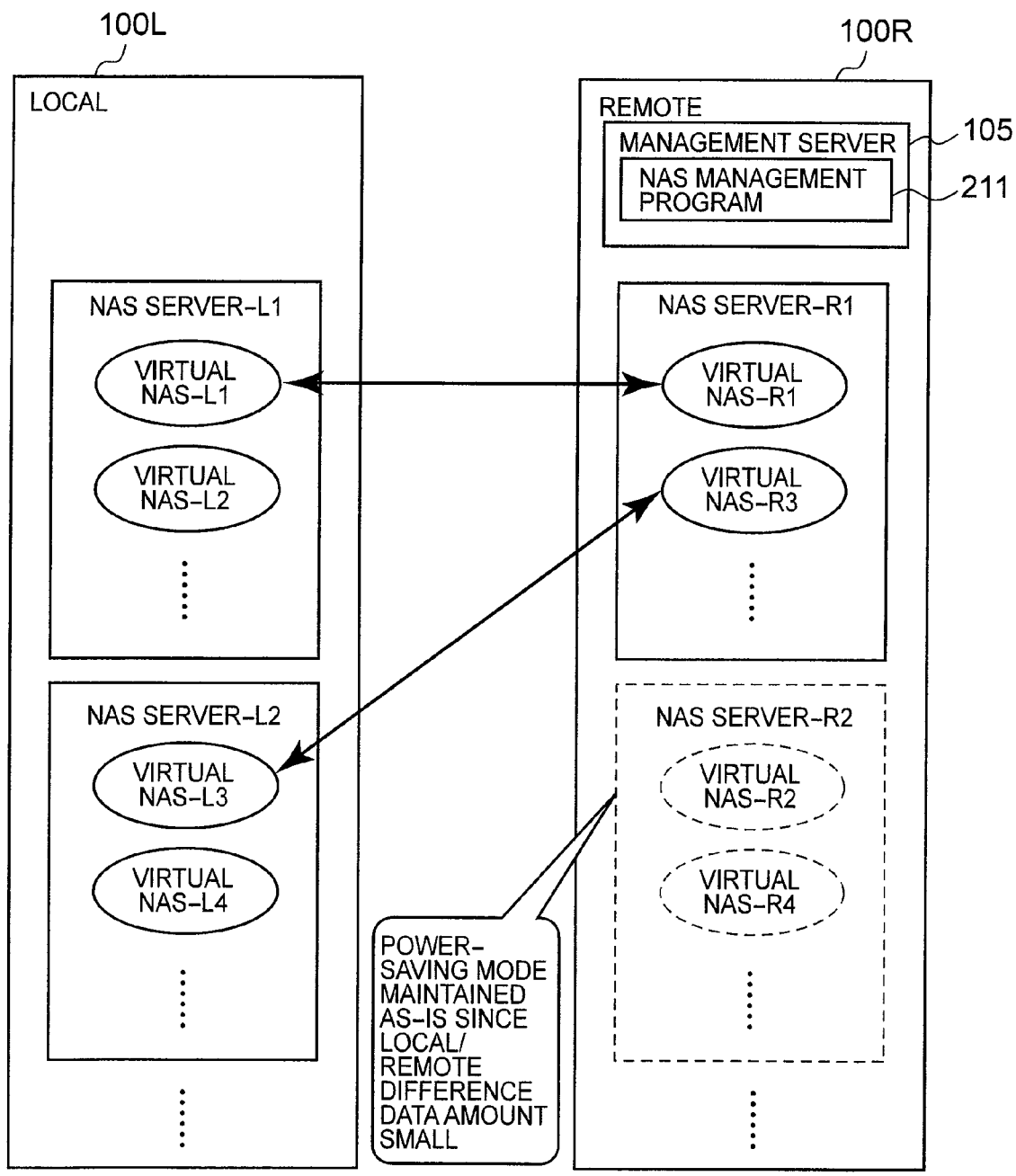
FIG. 20 shows the carrying out of a remote copy between virtual NAS-R1, virtual NAS-R3 and virtual NAS-L1, virtual NAS-L3 inside the NAS server-R which has had the power-saving mode released.

As shown in FIG. 20, the virtual NAS-R1 (and virtual NAS-R3) inside the booted NAS server-R1 respectively receives snapshot difference data from virtual NAS-L1 (and virtual NAS-L3) at a fixed time (at pre-configured remote copy date/time), and updates the PVOL-R1 (and PVOL-R3), the DVOL-R1 (and DVOL-R3), and snapshot management table-R1 (and snapshot management table-R3). Consequently, the PVOL-R1 (and PVOL-R3), the DVOL-R1 (and DVOL-R3), and snapshot management table-R1 (and snapshot management table-R3) constitute the same contents as the PVOL-L1 (and PVOL-L3), the DVOL-L1 (and DVOL-L3), and snapshot management table-L1 (and snapshot management table-L3). Furthermore, instead of the post-boot remote copy of virtual NAS-Ri being at a fixed time, the remote copy can be carried out in accordance with the booted virtual NAS-Ri requesting the virtual NAS-Li for a remote copy. That is, the start of the remote copy can be triggered by the booting of the virtual NAS-Ri.

Thereafter, Step 2 and beyond are carried out. That is, for example, when there is a change in the pre-configured snapshot acquisition schedule and/or remote copy schedule, since the log information also changes, the virtual NAS-Ri can be put into groups and a migration can be executed. Or, even when a change occurs in the pattern for generating the amount of snapshot difference data (for example, even when the amount of snapshot difference data generated per unit of time increases), the virtual NAS-Ri can be put into groups and a migration can be executed.

The processing flows carried out by the remote copy program-Li, remote copy program-Ri and NAS management program 211 will be explained below.

Figure 22:
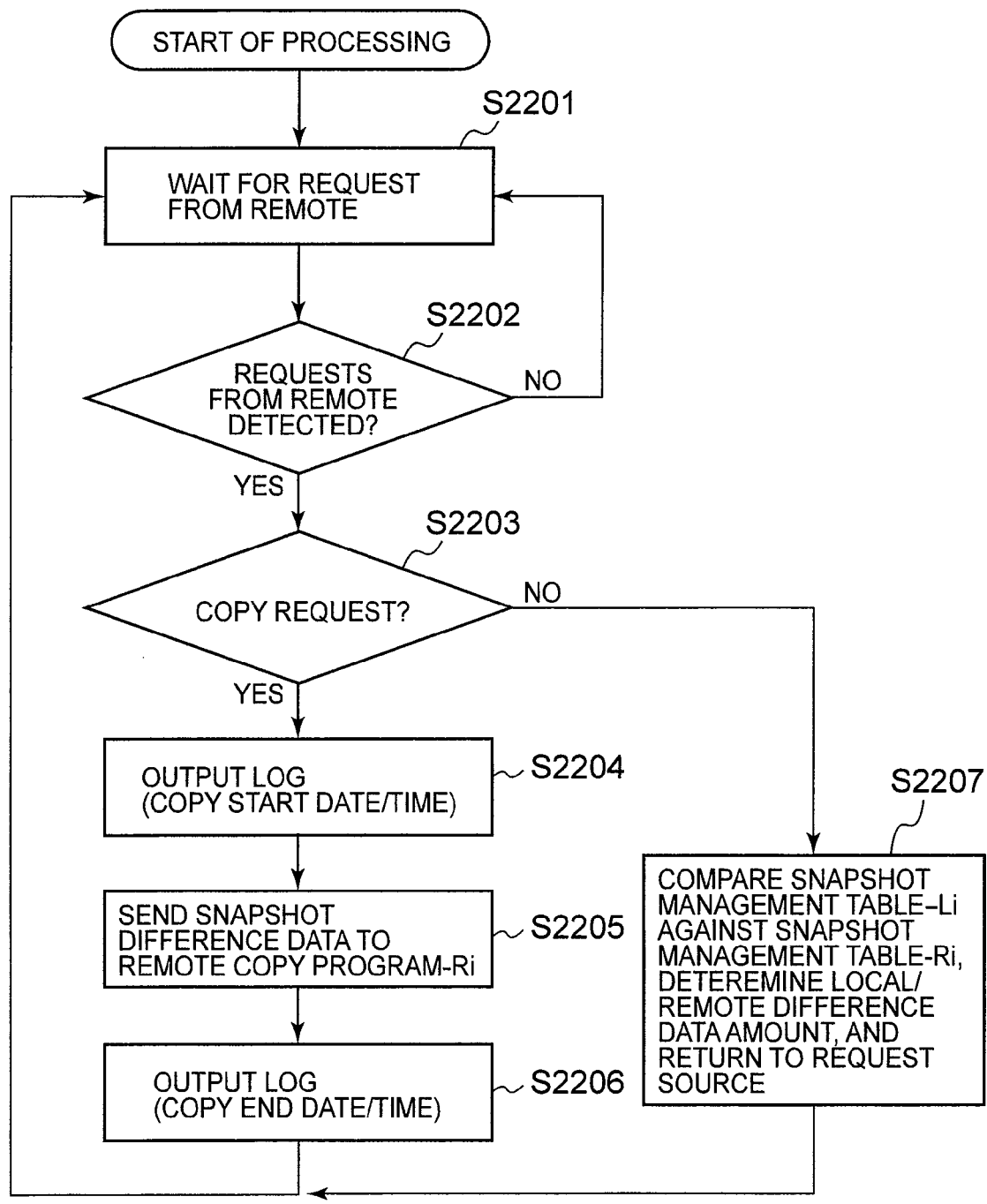
FIG. 22 is a flowchart of the processing carried out by a remote copy program-Li.

FIG. 22 is a flowchart of the processing carried out by remote copy program-Li.

Remote copy program-Li waits for a request from the remote side (S2201). Remote copy program-Li, upon detecting a request from the remote side (S2202: YES), carries out S2204 through S2206 if this request is a copy request received from remote copy program-Ri (S2203: YES), and carries out S2207 if this request is a query for the amount of local/remote difference data received from the management server 105.

In S2204, remote copy program-Li adds a log (copy start date/time) to the log information.

In S2205, remote copy program-Li specifies the snapshot difference data group between the base-point snapshot and the copy-targeted snapshot, based on the snapshot management table-Li, and sends the specified snapshot difference data group to remote copy program-Ri.

In S2206, remote copy program-Li adds a log (copy end date/time) to the log information.

In S2207, remote copy program-Li computes the amount of local/remote difference data by comparing snapshot management table-Ri against the latest snapshot management table-Li, and notifies the computed local/remote difference data amount to the management server 105. The snapshot management table-Ri that is the target of comparison here is the table received from either the management server 105 or remote copy program-Ri.

Figure 23:
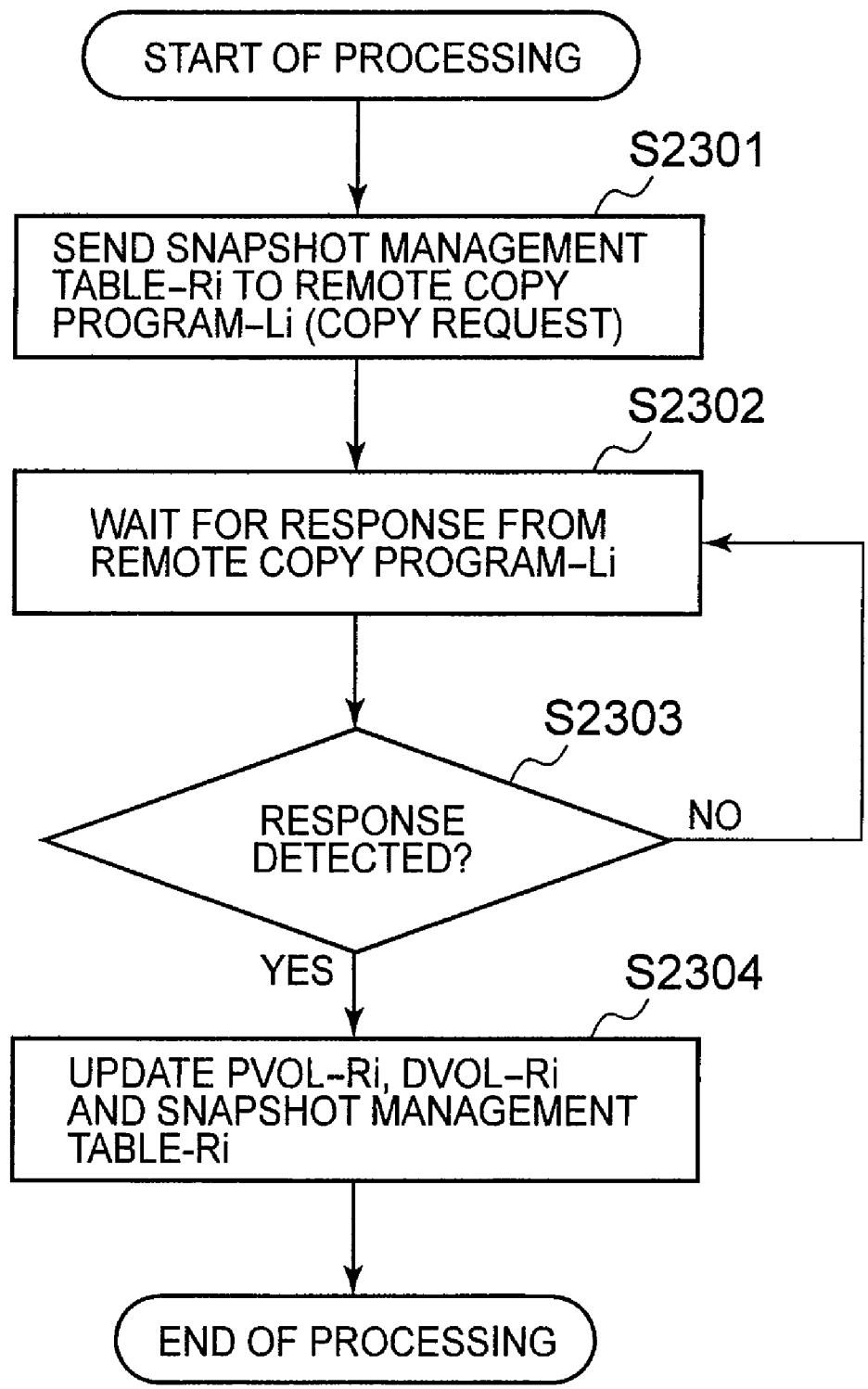
FIG. 23 is a flowchart of the processing carried out by a remote copy program-Ri.

FIG. 23 is a flowchart of the processing carried out by remote copy program-Ri. This processing is started either regularly or irregularly in accordance with a pre-configured remote copy schedule for remote copy program-Ri.

Remote copy program-Ri reads out the latest snapshot management table-Ri from the DVOL-Ri, and sends this latest table to remote copy program-Li (S2301). Then, remote copy program-Ri waits for a response from remote copy program-Li (S2302).

Remote copy program-Ri, upon detecting this response (S2203: YES), that is, upon receiving the snapshot difference data, updates the PVOL-Ri, DVOL-Ri and snapshot management table-Ri by carrying out a COW, which saves to the DVOL-Ri the data stored in the copy-destination storage area (the storage area inside the PVOL-Ri) of the received snapshot difference data, and writing the snapshot difference data to the copy-destination storage area (S2304).

Figure 24:
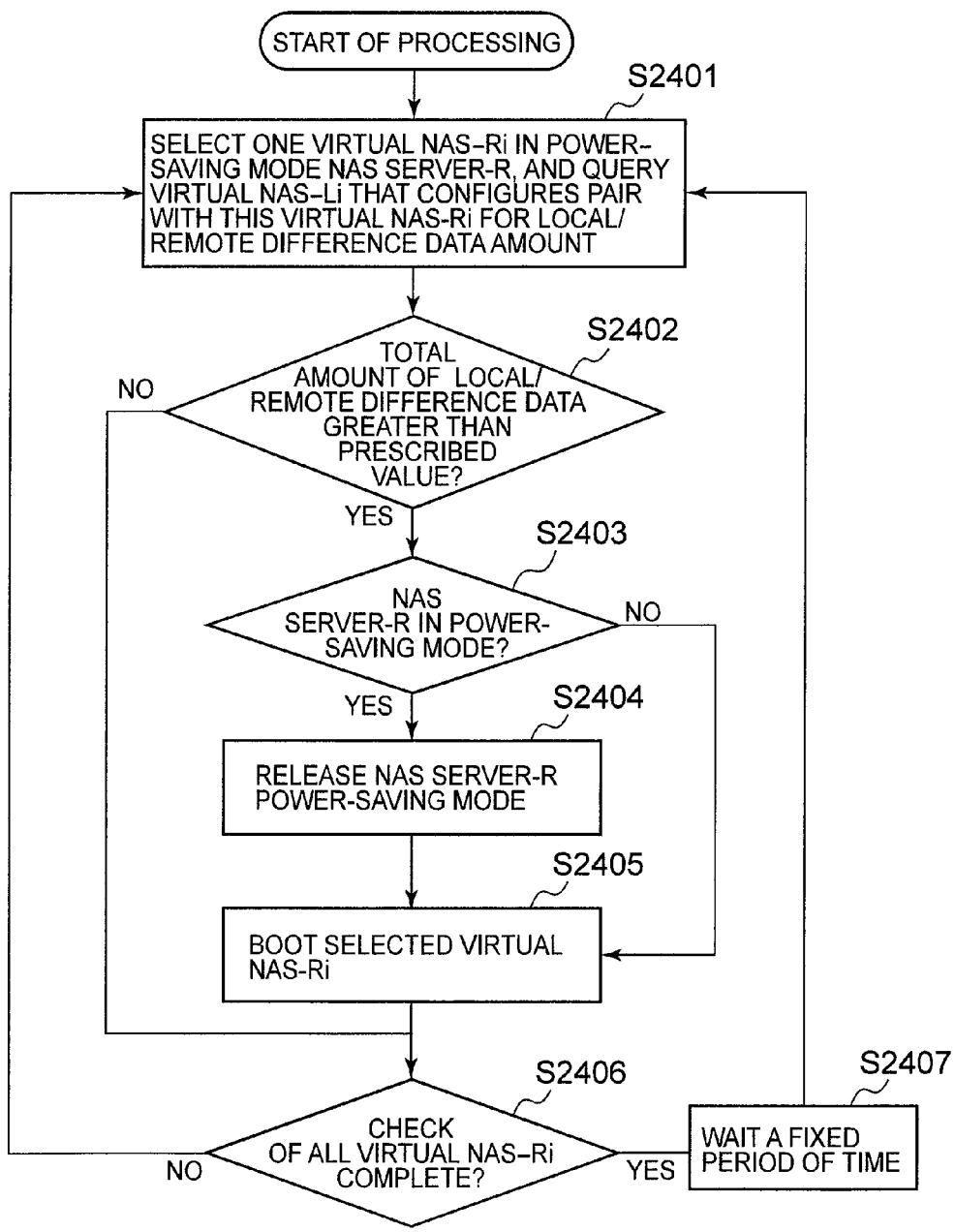
FIG. 24 is a flowchart of the processing carried out by a boot processing program inside the NAS management program.

FIG. 24 is a flowchart of the processing carried out by a boot processing program 2111 inside the NAS management program 211. This processing is executed either regularly or irregularly independent of the processing shown in FIGS. 22 and 23.

The boot processing program 2111 selects one virtual NAS-Ri from inside the suspended NAS server-R, and queries the virtual NAS-Li that constitutes a pair with the selected virtual NAS-Ri as to the amount of local/remote difference data (S2401). In response to this query, the local/remote difference data amount is sent from the remote copy program-Li inside the virtual NAS-Li.

When the total local/remote difference data for virtual NAS-Ri exceeds a first prescribed value, and/or when the total local/remote difference data for the NAS server-R having this virtual NAS-Ri exceeds a second prescribed value (S2402: YES), the boot processing program 2111 determines whether or not this NAS server-R is in the power-saving mode (S2403). If this NAS server-R is in the power-saving mode (S2403: YES), the boot processing program 2111 releases this NAS server R from the power-saving mode (S2404), and at least boots the virtual NAS-Ri selected in S2401 (S2405).

Thereafter, if S2401 and beyond have not been carried out for all the virtual NAS-R (S2406: NO), the boot processing program 2111 executes S2401 for the unselected virtual NAS-R. Conversely, if S2401 and beyond have been carried out for all the virtual NAS-R (S2406: YES), the boot processing program 2111 waits for a fixed period of time (S2407), and once again executes S2401.

Figure 25:
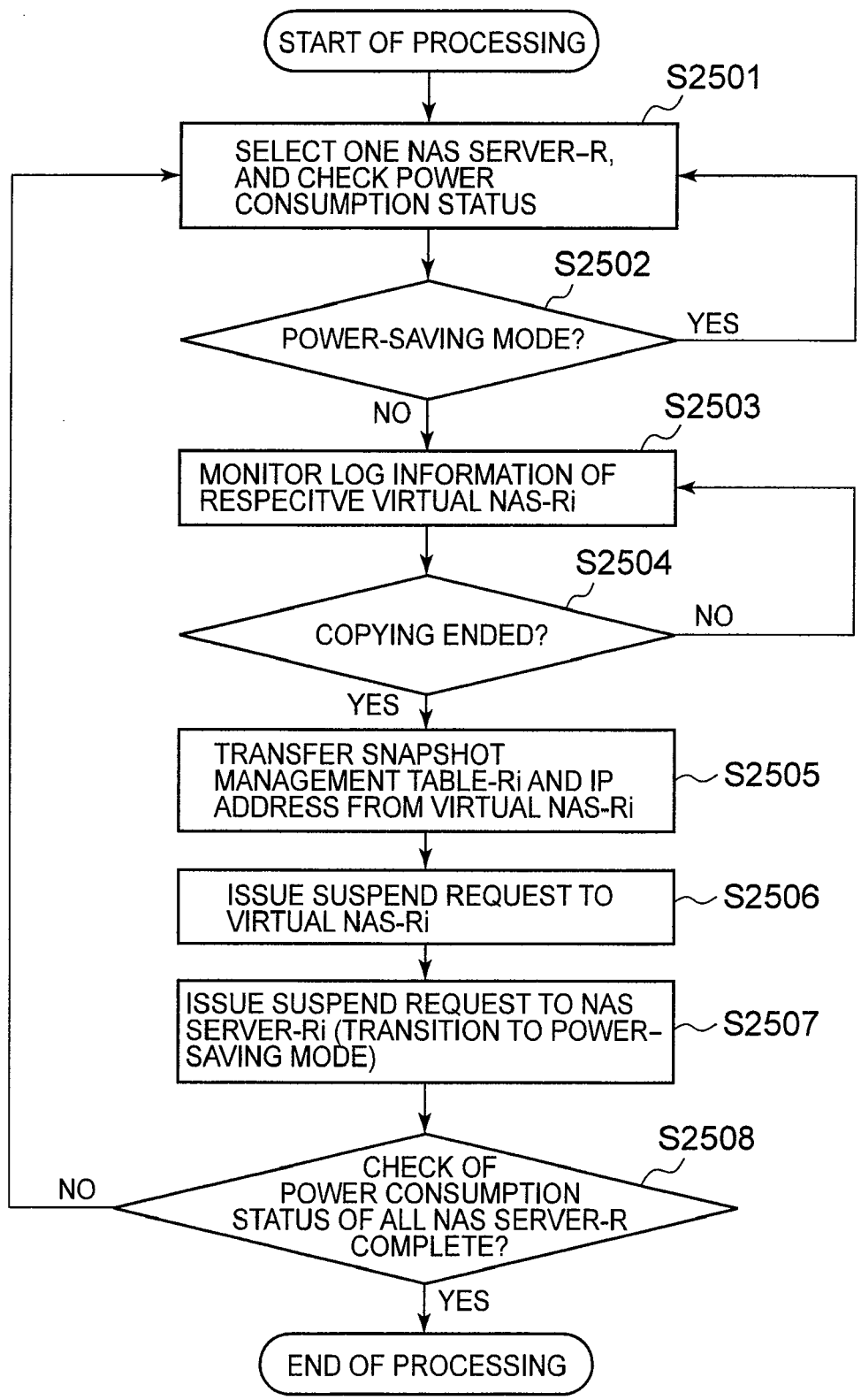
FIG. 25 is a flowchart of the processing carried out by a suspend processing program inside the NAS management program.

FIG. 25 is a flowchart of processing carried out by a suspend processing program 2112 inside the NAS management program 211. This processing is executed either regularly or irregularly independently of the processing shown in FIGS. 22 and 23.

The suspend processing program 2112 selects one NAS server-R from among the plurality of NAS server-R, and checks the power consumption status of the selected NAS server-R (S2501).

If the checked power consumption status is not the power-saving mode (S2502: NO), the suspend processing program 2112 monitors the log information of the respective virtual NAS-Ri inside the NAS server-R selected in S2501 (S2503).

If the suspend processing program 2112 is able to specify from the log information corresponding to the plurality of virtual NAS-Ri that a remote copy has been completed for all of this plurality of virtual NAS-Ri (S2504: YES), the suspend processing program 2112 receives the transfer of the IP addresses used to communicate with the virtual NAS-Li and the snapshot management table-Ri for this plurality of virtual NAS-Ri (S2505).

The suspend processing program 2112 sends a suspend request to the respective virtual NAS-Ri inside the NAS server-R selected in S2501 (S2506). Consequently, the respective virtual NAS-Ri are suspended.

Thereafter, the suspend processing program 2112 sends a suspend request (a request to transition to the power-saving mode) to the NAS server-R selected in S2501 (S2507). Consequently, this NAS server-R transitions to the power-saving mode.

If S2501 and beyond have not been carried out for all the NAS server-R (S2608: NO), the suspend processing program 2112 executes S2501 for unselected NAS server-R, and if S2501 and beyond have been carried out for all the NAS server-R (S2608: YES), ends processing. Furthermore, the suspend processing program 2112 can inform the user as to which of the NAS server-R are targets for transition to the power-saving mode via a screen display or voice output.

Figure 26:
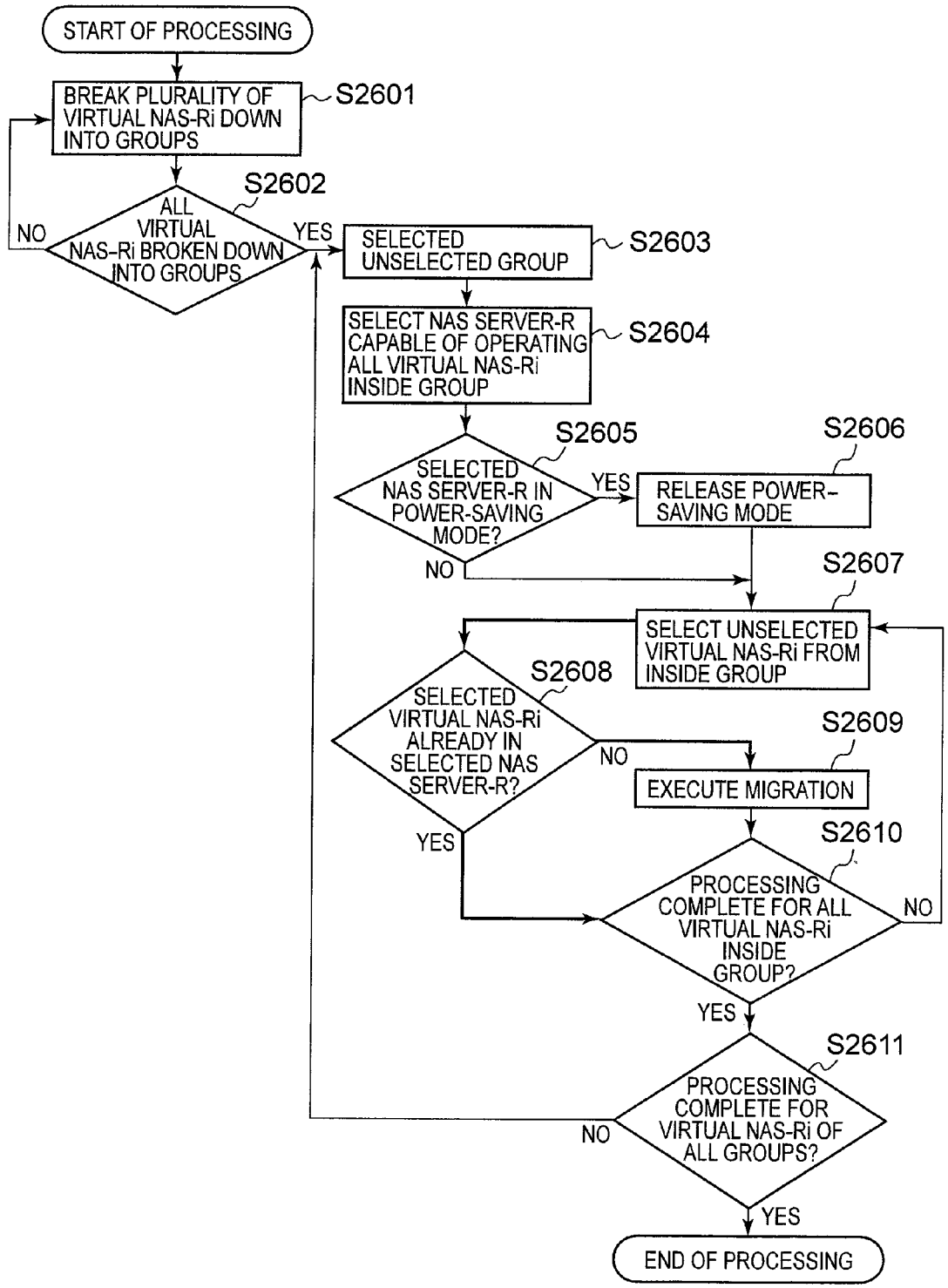
FIG. 26 is a flowchart of the processing carried out by a migration processing program inside the NAS management program.

FIG. 26 is a flowchart of the processing carried out by a migration processing program 2113 inside the NAS management program 211. This processing is executed either regularly or irregularly independently of the processing shown in FIGS. 22 and 23.

The migration processing program 2113 groups the plurality of virtual NAS-Ri on the basis of the log information (FIGS. 12A through 12D) and the difference data amount table 1800 (refer to FIG. 18) (S2601 and S2602: NO).

If this grouping has been completed (S2602: YES), the migration processing program 2113 selects one group from among the plurality of groups (S2603).

The migration processing program 2113 selects, based on the number of virtual NAS-Ri inside the selected group and the specification table 1300 (refer to FIG. 14), the NAS server-R with the computer resources capable of operating all the virtual NAS-Ri inside the selected group (S2604). If this NAS server-R is in the power-saving mode (S2605: YES), the migration processing program 2113 releases this NAS server-R from the power-saving mode (S2606).

The migration processing program 2113 selects one virtual NAS-Ri from among the plurality of virtual NAS-Ri inside the group selected in S2603 (S2607). The migration processing program 2113 determines whether or not the selected virtual NAS-Ri resides in the NAS server-R selected in S2604 (S2608). If this virtual NAS-Ri resides in another NAS server-R (S2608: NO), the migration processing program 2113 migrates this virtual NAS-Ri from the other NAS server-R to the NAS server-R selected in S2604 (S2609). In this migration, the above-described processing of (S2A-1) through (S2A-3) is carried out.

S2607 through S2609 are carried out for all the virtual NAS-Ri inside the group selected in S2603 (S2610: NO). Further, S2603 through S2610 are carried out for all the groups (S2611: NO).

Figure 27:
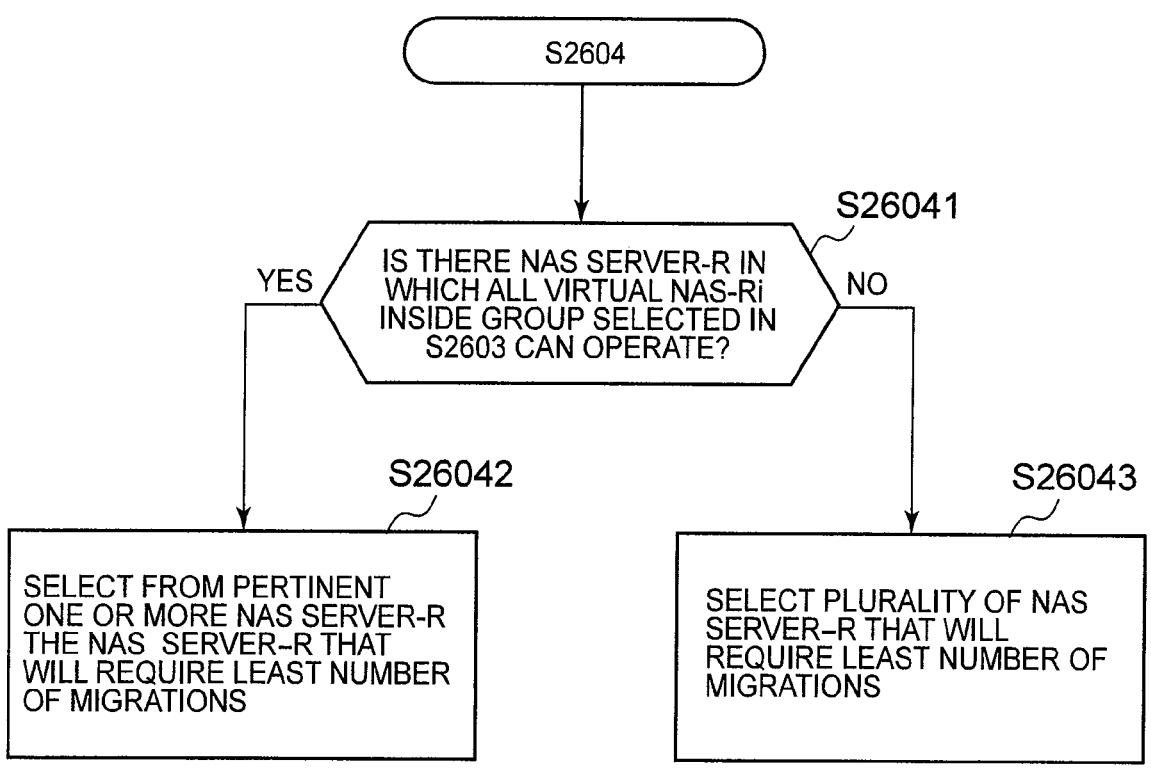
FIG. 27 shows an example of the details of S2604 of FIG. 26.

FIG. 27 shows an example of the details of S2604 of FIG. 26.

The migration processing program 2113 uses the specifications table 1300 to search for one NAS server-R that is capable of operating all the virtual NAS-Ri inside the group selected in S2603 (S26041).

In S26041, if there is one or more of the pertinent NAS server-R (S26041: YES), the migration processing program 2113 selects from among the one or more pertinent NAS server-R the NAS server-R for which the number of migrations will be the least (S26042). The NAS server-R that is selected here, in other words, is the NAS server-R in which resides most of the virtual NAS-Ri that are in the group selected in S2603.

Conversely, in S26041, if there is no pertinent NAS server-R (S26041: NO), the migration processing program 2113 selects a plurality of NAS server-R for distributively operating all of the virtual NAS-Ri inside the group selected in S2603 (S26043). Specifically, for example, if there are 20 virtual NAS-Ri inside the group selected in S2603, and there are two NAS server-R with maximum virtual NAS-Ri capacities of 15 and 5, these two NAS server-R are selected. Furthermore, the NAS server-R for which the number of migrations will be the least can also be selected in S26043.

According to the above-described embodiment, a plurality of virtual NAS-R have a similar remote copy pattern (defined by the transfer date/time, length of transfer time, and amount of snapshot difference data) are consolidated into the same NAS server-R, and virtual NAS-Ri with dissimilar remote copy patterns do not reside in this NAS server-R. Thus, the remote copy start date/times and end date/times for all the virtual NAS-Ri residing in the same NAS server-R approximate one another. Therefore, the length of time that a remote copy is not carried out for this NAS server-R can be made as long as possible, and accordingly, the length of time that this NAS server-R can be in the power-saving mode can be made as long as possible.

The preceding has been explanations of a number of preferred embodiments of the present invention, but these embodiments are examples for explaining the present invention, and do not purport to limit the scope of the present invention solely to these embodiments. The present invention can be put into practice in a variety of other modes.

What is claimed is:

1. A remote copy system, comprising:
   a local controller group and a local storage device that are provided at a local site;
   a remote controller group and a remote storage device that are provided at a remote site; and
   a management computer, wherein
   the local controller group is configured from one or more local controllers,
   the local controller is connected to a higher-level device, the local storage device, the remote controller group, and the management computer, and has a first computer resource for local virtual computer operation,
   the local virtual computer is a computer that receives an access request from the higher-level device, and accesses a local storage device of any of the local storage device, in response to the access request,
   the remote controller group is configured from a plurality of remote controllers,
   the remote controllers are connected to the local controller group, the remote storage device, and the management computer respectively, and have a second computer resource for remote virtual computer operation,
   a plurality of the local virtual computers operate in the local controller,
   a plurality of the remote virtual computers that constitute respective pairs with the plurality of local virtual computers operate in the remote controller group,
   the local virtual computer executes a transfer process, and in the transfer process executes a process of reading out data from the local storage device, and transferring the read-out data to a second remote copy module that is executed by the remote virtual computer, which is partnered with the local virtual computer that executes a first remote copy module,
   the remote virtual computer receives data from the first remote copy module, and writes the received data to the remote storage device,
   the management computer has a migration processor,
   the migration processor migrates, from among a plurality of the remote virtual computers, two or more remote virtual computers, which belong to a group configured from remote virtual computers having remote copy patterns that are similar to one another, to the same remote controller, and
   a remote virtual computer having a dissimilar remote copy pattern and the two or more remote virtual computers do not reside in the same remote controller.

2. The remote copy system according to claim 1, wherein the management computer is provided at the remote site,
   in the local storage device, a first logical volume and a second logical volume are provided for each local virtual computer,
   in the remote storage device, a third logical volume and a fourth logical volume are provided for each remote virtual computer,
   a first remote copy module that either regularly or irregularly executes the transfer processing, and a first snapshot acquisition module that acquires a snapshot of the first logical volume are executed by the respective local virtual computers,
   a second remote copy module, and a second snapshot acquisition module that acquires a snapshot of the third logical volume are executed by the respective remote virtual computers,
   the first computer resource comprises a first storage resource, a first snapshot management table is stored in the first storage resource and/or the second logical volume for each of the local virtual computers, and the first snapshot management table shows an address of a save-destination storage area inside the second logical volume with regard to the respective storage areas configuring the first logical volume for each snapshot,
   the second computer resource comprises a second storage resource, a second snapshot management table is stored in the second storage resource and/or the fourth logical volume for each of the remote virtual computers, and the second snapshot management table shows an address of a save-destination storage area inside the fourth logical volume with regard to the respective storage areas configuring the third logical volume for each snapshot, the first snapshot acquisition module receives from the higher-level device a write request specifying any of a plurality of storage areas that configure the first logical volume on and after a certain snapshot acquisition point in time, and when a write-destination storage area specified from the write request has not been updated, saves the data stored in the write-destination storage area to a certain storage area inside the second logical volume, writes the data that accords with the write request to the write-destination storage area, and updates the address of the save-destination storage area corresponding to the certain snapshot and the write-destination storage area to the certain storage area in the first snapshot management table, the data read out and transferred in the transfer process of the first remote copy module is difference data, which is data that corresponds to a difference between a copied snapshot of a first acquisition point in time and a copy-targeted snapshot, from among the data stored in the first and/or the second logical volume, and which is specified on the basis of the first snapshot management table, the second remote copy module receives the difference data, the second snapshot acquisition module saves data stored in the copy-destination storage area inside the third logical volume to a certain storage area inside the fourth logical volume, writes the difference data to the copy-destination storage area, and updates the address of the save-destination storage area corresponding to the copy-targeted snapshot and the copy-destination storage area in the second snapshot management table, the migration processor:

(2-1) classifies the plurality of remote virtual computers into two or more groups configured by remote virtual computers with similar remote copy patterns;

(2-2) selects a group from the two or more groups;

(2-3) selects from the remote controller group a remote controller that has a second computer resource by which two or more remote virtual computers that belong to the selected group can operate; and (2-4) when a certain remote virtual computer of the two or more remote virtual computers belonging to the selected group resides in the selected remote controller and another remote controller, migrates the certain remote virtual computer from the other remote controller to the selected remote controller, two or more of the first remote copy module of each of two or more local virtual computers that configure respective pairs with two or more remote virtual computers belonging to the same group parallelly carry out the transfer process, the copy-destination storage area is a storage area inside the third logical volume that has the same address as the storage area, inside the first logical volume, which either stores the difference data, or which is the save source of the difference data, and the remote copy pattern is transfer process date/time and length of transfer time, and an amount of inter-snapshot difference data that has not been transferred in the transfer process, for the respective local virtual computers corresponding to the respective remote virtual computers.

3. The remote copy system according to claim 2, wherein the management computer comprises a power-saving module, and the power-saving module sets the selected remote controller to a power-saving mode when the receiving and writing of difference data has been completed in two or more remote virtual computers inside the selected remote controller.

4. The remote copy system according to claim 3, wherein the management computer comprises a power-saving release module, and the power-saving release module acquires two or more of the second snapshot management tables respectively corresponding to two or more remote virtual computers inside the power-saving mode remote controller, and sends the two or more second snapshot management tables to two or more local virtual computers respectively configuring pairs with the two or more remote virtual computers, the first remote copy module computes an amount of local/remote difference data, which is differences between the first and second logical volumes, and the third and fourth logical volumes, by comparing the received second snapshot management table with a first snapshot management table corresponding to a local virtual computer that has this first remote copy module, and notifies the power-saving release module of the computed local/remote difference data amount, the power-saving release module, based on the amount of local/remote difference data notified from the first remote copy module of the respective local virtual computers, releases the power-saving mode of the remote controller in relation to the total amount which is larger than a first prescribed value and/or a second prescribed value, when the total amount of the local/remote difference data in remote virtual computer units is larger than the first prescribed value, and/or when the total amount of the local/remote difference data in remote controller units is larger that the second prescribed value.

5. The remote copy system according to claim 4, wherein the migration processor executes the following (5-1) through (5-3) as the migration of the certain remote virtual computer:

(5-1) suspending the certain remote virtual computer in the other remote controller;

(5-2) connecting a certain system area of the plurality of system areas, in which the certain remote virtual computer is stored, to the selected remote controller; and (5-3) causing the selected remote controller to boot the certain remote virtual computer, which is stored in the certain system area.

6. The remote copy system according to claim 1, wherein the migration processor:

(6-1) classifies the plurality of remote virtual computers into two or more groups configured by remote virtual computers with similar remote copy patterns;

(6-2) selects a group from the two or more groups;

(6-3) selects from the remote controller group a remote controller that has a second computer resource by which two or more remote virtual computers that belong to the selected group can operate; and (6-4) when a certain remote virtual computer of the two or more remote virtual computers resides in the selected remote controller and another remote controller, migrates the certain remote virtual computer from the other remote controller to the selected remote controller.

7. The remote copy system according to claim 6, wherein the remote copy pattern is the date/time and length of transfer time in the transfer process for respective local virtual computers corresponding to respective remote virtual computers.

8. The remote copy system according to claim 7, wherein the remote copy pattern is the date/time and length of transfer time in the transfer process, and the amount of data that has not been transferred in the transfer process for respective local virtual computers corresponding to respective remote virtual computers.

9. The remote copy system according to claim 6, wherein respective local virtual computers and respective remote virtual computers have a function for acquiring a snapshot, and
the remote copy pattern is based on a time interval between a snapshot acquisition and a subsequent snapshot acquisition for respective local virtual computers corresponding to respective remote virtual computers.

10. The remote copy system according to claim 6, wherein the management computer comprises:
a power-saving module that sets the remote controller in a power-saving mode; and
a power-saving release module that releases the power-saving mode of the remote controller, and wherein
when the total amount of data for which remote copying has not been completed between a remote virtual computer inside a certain remote controller in the power-saving mode and a local virtual computer that configures a pair with this remote virtual computer exceeds a prescribed value, the power-saving release module releases the power-saving mode of the certain remote controller.

11. The remote copy system according to claim 10, wherein a primary logical volume is provided in the local storage device for each local virtual computer,
a secondary logical volume is provided in the remote storage device for each remote virtual computer,
respective local virtual computers acquire a snapshot of the primary logical volume, and manage respective generations of snapshots using first snapshot management information for managing an inter-snapshot difference,
respective remote virtual computers acquire a snapshot of the secondary logical volume, and manage respective generations of snapshots using second snapshot management information for managing an inter-snapshot difference,
the power-saving module acquires respective second snapshot management information corresponding to respective remote virtual computers in a remote controller that transitions to the power-saving mode,
the power-saving release module sends the acquired respective second snapshot management information to respective local virtual computers corresponding to respective remote virtual computers in a remote controller that has transitioned to the power-saving mode,
the respective local virtual computers compute the amount of data for which remote copying has not been completed by comparing received second snapshot management information with first snapshot management information corresponding to the pertinent local virtual computer, and notifies the power-saving release module of the computed data amount, and
the power-saving release module, on the basis of the data amount notified from the respective local virtual computers, determines the total amount of data for which the remote copying has not been completed in remote virtual computer units and/or remote controller units.

12. The remote copy system according to claim 10, wherein, when the power-saving mode of the certain remote controller is released, the power-saving release module boots only the remote virtual computer, in which the total amount of data for which remote copying has not been completed exceeds a prescribed value, of the two or more remote virtual computers inside the certain remote controller.

13. The remote copy system according to claim 6, wherein, when selecting a remote controller in the (6-3), and if there is no single remote controller that has a second computer resource by which two or more remote virtual computers belonging to the selected group can operate, the migration processor selects a plurality of remote controllers configuring second computer resources by which two or more remote virtual computers belonging to the selected group can operate.

14. The remote copy system according to claim 6, wherein the remote controller selected in the (6-3) is a remote controller in which the remote virtual computers included in the selected group already reside by the largest number.

15. The remote copy system according to claim 6, wherein the management computer comprises a power-saving module that sets a remote controller, for which the receiving and writing of remote copy-targeted data has been completed, to the power-saving mode.

16. A remote site power-saving method, which is accomplished by a remote copy system comprising:
a local controller group and a local storage device provided in a local site; and
a remote controller group and a remote storage device provided at a remote site,
the local controller group being configured by one or more local controllers,
the local controller being connected to a higher-level device, the local storage device, and the remote controller group, and having a first computer resource for local virtual computer operation,
the local virtual computer being a computer that receives an access request from the higher-level device, and accessing the local storage device in response to the access request,
the remote controller group being configured from a plurality of remote controllers,
the respective remote controllers being connected to the local controller group and the remote storage device, and having a second computer resource for remote virtual computer operation,
a plurality of the local virtual computers operating in the local controller,
a plurality of the remote virtual computers, which constitute respective pairs with the plurality of local virtual computers, operating in the remote controller group,
the local virtual computer executing a transfer process, and, in the transfer process, executing a process for reading out data from the local storage device, and transferring the read-out data to a second remote copy module that is executed by the remote virtual computer, which is partnered with the local virtual computer that executes a first remote copy module,
the remote virtual computer receiving the data from the first remote copy module, and writing the received data to the remote storage device,
the remote site power-saving method comprising the steps of:
(16-1) classifying the plurality of remote virtual computers into two or more groups configured by remote virtual computers with similar remote copy patterns;
(16-2) selecting a group from the two or more groups;

(16-3) selecting from the remote controller group a remote controller that has a second computer resource by which two or more remote virtual computers that belong to the selected group can operate;

(16-4) migrating a certain remote virtual computer from another remote controller to the selected remote controller when the certain remote virtual computer, of the two or more remote virtual computers, resides in the selected remote controller and the other remote controller, and (16-5) when the receiving and writing of data has not been carried out in a remote controller, in which two or more remote virtual computers belonging to the selected group reside, setting this remote controller to a power-saving mode.

17. A computer, which is provided in a remote copy system, comprising:

a local controller group and a local storage device provided at a local site; and a remote controller group and a remote storage device provided at a remote site, the local controller group being configured by one or more local controllers, the local controller being connected to a higher-level device, the local storage device, and the remote controller group, and having a first computer resource for local virtual computer operation, the local virtual computer being a computer that receives an access request from a higher-level device, and accessing the local storage device in response to the access request, the remote controller group being configured from a plurality of remote controllers, the respective remote controllers being connected to the local controller group and the remote storage device, and having a second computer resource for remote virtual computer operation, a plurality of the local virtual computers operating in the local controller, a plurality of the remote virtual computers, which constitute respective pairs with the plurality of local virtual computers, operating in the remote controller group, the local virtual computer executing a transfer process, and, in the transfer process, executing a process for reading out data from the local storage device, and transferring the read-out data to a second remote copy module that is executed by the remote virtual computer, which is partnered with the local virtual computer that executes the first remote copy module, the remote virtual computer receiving the data from the first remote copy module, and writing the received data to the remote storage device, the computer comprising:

a specification module that specifies a remote copy pattern related to respective remote virtual computers; and a classification module that classifies the respective remote virtual computers into two or more groups configured from remote virtual computers for which the specified pattern is similar.

18. The computer according to claim 17, further comprising:

a migration module that migrates a certain remote virtual computer from another remote controller to a certain remote controller when the certain remote virtual computer, of two or more remote virtual computers belonging to a certain group, resides in the certain remote controller and the other remote controller.

* * * * *